United States Patent
Kitagawa

(10) Patent No.: US 7,370,929 B2
(45) Date of Patent: May 13, 2008

(54) PRINTER, DITHER MATRIX GENERATION METHOD, AND RECORDING MEDIUM

(75) Inventor: Osamu Kitagawa, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 11/655,893

(22) Filed: Jan. 22, 2007

(65) Prior Publication Data

US 2007/0171247 A1 Jul. 26, 2007

(30) Foreign Application Priority Data

Jan. 25, 2006 (JP) .......................... P2006-016088

(51) Int. Cl.
*B41J 2/205* (2006.01)
(52) U.S. Cl. .................. 347/15; 358/1.9; 358/3.13
(58) Field of Classification Search .................. 347/15, 347/43; 358/1.2, 1.9, 3.03, 3.13, 3.06, 3.23
See application file for complete search history.

(56) References Cited

U.S. PATENT DOCUMENTS 7,187,387 B2 * 3/2007 Deishi .................. 345/596
7,201,462 B2 * 4/2007 Shibata et al. .................. 347/19

FOREIGN PATENT DOCUMENTS

| JP | 3179183 | 6/2001 |
|----|---------|--------|
| JP | 2004-106248 | 4/2004 |

\* cited by examiner

*Primary Examiner*—Lamson Nguyen
(74) *Attorney, Agent, or Firm*—McDermott Will & Emery LLP

(57) ABSTRACT

A printer has a head where outlets are arranged in a width direction perpendicular to a predetermined scan direction, and a printing paper moves under the head in the scan direction. In a basic dither matrix which is an array where element values are arranged in a column direction corresponding to the scan direction and a row direction corresponding to the width direction and positions in the row direction are associated with the outlets in the head, respectively, the element values are modified on the basis of variation in print densities with respect to the width direction caused by ejection from the outlets. In the printer, printing is performed with the modified dither matrix, it is therefore possible to print an image at high speed and easily, where unevenness caused by variation in ejection amounts of droplets from the outlets or the like is suppressed.

31 Claims, 14 Drawing Sheets

| 1 | 4 |
|---|---|
| 3 | 2 |
— 821C

| 3 | 1 |
|---|---|
| 2 | 4 |
— 821M

| 2 | 3 |
|---|---|
| 4 | 1 |
— 821Y

| 4 | 2 |
|---|---|
| 1 | 3 |
— 821K

FIG. 23
| OUTLET NUMBER | 1 | 2 | 3 | 4 | ..... | 14400 |
|---|---|---|---|---|---|---|
| CORRECTION COEFFICIENT | 0.98 | 1.05 | 1.00 | 0.96 | | 0.96 |
FIG. 24
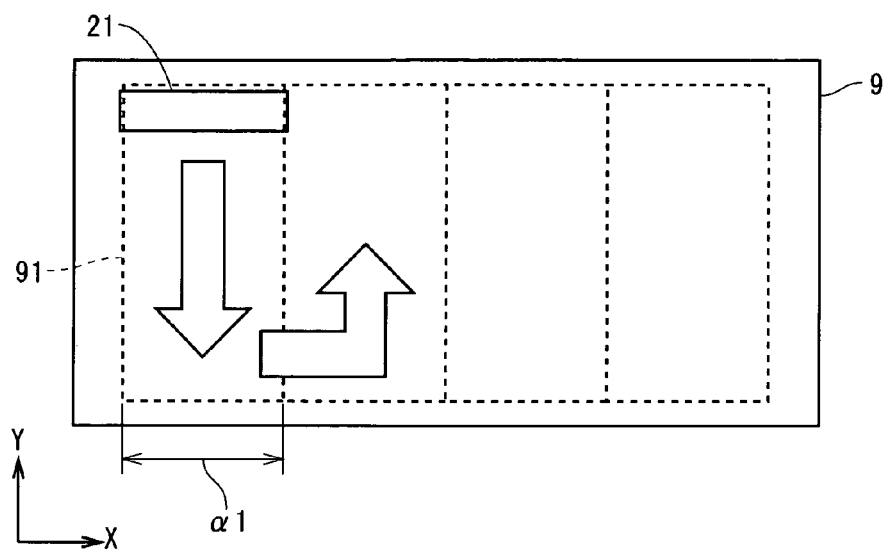
FIG. 25
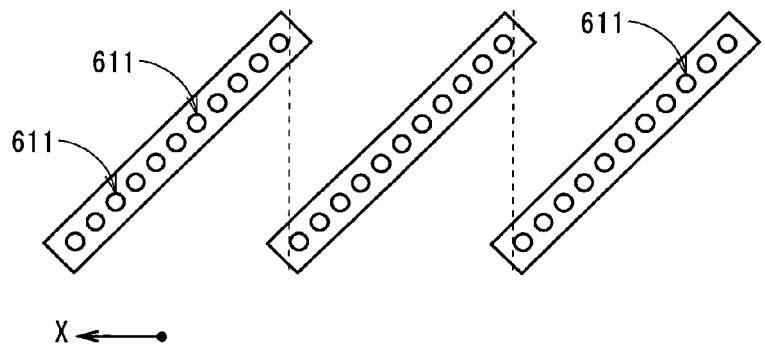

PRINTER, DITHER MATRIX GENERATION METHOD, AND RECORDING MEDIUM

BACKGROUND OF THE INVENTION

1. Field of the Invention

The present invention relates to an inkjet printer, a dither matrix generation method for generating a dither matrix which is used in generating a halftone image from a grayscale original image, and a recording medium in which data of the dither matrix is recorded.

2. Description of the Background Art

Conventionally used has been an inkjet printer provided with a head having a plurality of outlets, where the head moves relatively to a printing paper and printing is performed by controlling ON/OFF of ejection of fine droplet of ink from each outlet. As such a printer, known has been an apparatus where a head, in which a plurality of outlets are arranged in a direction perpendicular to a scan direction in a whole range corresponding to a width of printing paper, is provided and printing is performed at high speed with one scan (one pass) of the head relative to the printing paper.

Japanese Patent Application Laid-Open No. 2004-106248 (Document 1) discloses a technique for surely preventing occurrence of unevenness (mura) in a printed image caused by variation in ejection amounts of droplets from a plurality of outlets in an inkjet printer for printing with one pass, where a density measurement part measuring a density of each position in a width direction on a printing paper is provided and an ejection amount of droplet is corrected (i.e., the so-called shading compensation is performed) on the basis of a measured value of density in a region corresponding to each outlet in a pattern with a uniform density level (as a setting) which is printed by the head (hereinafter, the measured value is referred to as "a print density in outlet"). Document 1 further discloses a method for preventing occurrence of the above unevenness in a printed image by modifying each pixel value in a grayscale image to be written (hereinafter, referred to as "original image") on the basis of a print density in outlet corresponding to the pixel value.

Meanwhile, in an inkjet printer, a grayscale original image has to be binarized and in the case where the dither technique is used for binarization of the original image, each pixel value in the original image and the corresponding element value in a dither matrix are compared in an electric circuit or a software integrated circuit (halftoning circuit) to perform halftoning of the original image. In such a printer, as disclosed in Document 1, when each pixel value in the original image is modified on the basis of the print density in outlet corresponding to the pixel value, a calculation operation has to be performed for multiplying each pixel value in the original image by a correction coefficient derived from the print density in outlet before halftoning of the original image and it is difficult to print an image at high speed. It is thought that the above calculation operation is performed in an electric circuit, but a special circuit (shading compensation circuit) is needed and this increases the manufacturing cost for the printer.

SUMMARY OF THE INVENTION

The present invention is intended for an inkjet printer for printing a halftone image generated by comparing a grayscale original image with a dither matrix. It is an object of the present invention to print an image at high speed and easily, where unevenness caused by variation in ejection amounts of droplets from a plurality of outlets or the like is suppressed.

The printer comprises a head having a plurality of outlets arranged in a width direction perpendicular to a predetermined scan direction each of which ejects droplets of ink onto a printing medium; a scanning mechanism for moving the printing medium relatively to the head in the scan direction; a matrix memory for storing a modified dither matrix which is a two-dimensional array where a plurality of element values are arranged in a column direction corresponding to the scan direction and a row direction corresponding to the width direction, a plurality of positions in the row direction as many as the plurality of outlets are associated with the plurality of outlets, respectively, and the plurality of element values are modified on the basis of variation in print densities with respect to the width direction caused by ejection from the plurality of outlets; and an ejection controller for controlling ejection of ink from the plurality of outlets, in accordance with comparison results between pixel values of the original image at positions of the plurality of outlets relative to the printing medium and element values of the modified dither matrix corresponding to the pixel values, in synchronization with movement of the printing medium relative to the head.

According to the present invention, by using the modified dither matrix where each element value is modified on the basis of variation in print densities, it is possible to print an image at high speed and easily, where unevenness caused by variation in ejection amounts of droplets from the plurality of outlets or the like is suppressed.

According to a preferred embodiment of the present invention, the printer further comprises a density measurement part for measuring densities of regions corresponding to the plurality of outlets in a predetermined pattern on the printing medium which is printed by the head with using an unmodified dither matrix; and an operation part for obtaining the modified dither matrix on the basis of the unmodified dither matrix and measurement results acquired by the density measurement part. This makes it possible to easily obtain the modified dither matrix in the printer. Preferably, the predetermined pattern includes a plurality of pattern elements corresponding to a plurality of density levels, respectively, and the measurement results are acquired through measurement of the plurality of pattern elements by the density measurement part. It is thereby possible to further suppress occurrence of unevenness in a printed image.

According to another preferred embodiment of the present invention, the head comprises a plurality of ejection modules in each of which outlets are arranged at a regular ejection pitch in the width direction, and a center-to-center distance in the width direction of adjacent outlets between each combination of adjacent two of the plurality of ejection modules is equal to or longer than 0 and shorter than the ejection pitch. This makes it possible to surely prevent the center-to-center distance in the width direction of the adjacent outlets between the two ejection modules from being longer than the ejection pitch and prevent a space extending in the scan direction from appearing in the printed image, and unevenness in the printed image caused by the center-to-center distance of the adjacent outlets can be suppressed.

More preferably, the printer in which the head comprises the plurality of ejection modules further comprises a density measurement part for measuring densities of regions corresponding to the plurality of outlets in a predetermined pattern on the printing medium which is printed by the head with using an unmodified dither matrix; and an operation part for obtaining the modified dither matrix on the basis of the unmodified dither matrix and measurement results acquired by the density measurement part, and the predetermined pattern includes position indicating parts each of which is located away in the scan direction from a portion used for measurement of densities and associated with positions of the adjacent outlets. This makes it possible to accurately specify positions in the predetermined pattern written by the adjacent outlets between the two ejection modules. The density measurement part detects the position indicating parts, whereby a level of smoothing of measurement results is reduced in measuring densities of regions corresponding to the adjacent outlets in the predetermined pattern. As a result, the modified dither matrix can be obtained with accuracy.

According to an aspect of the present invention, the plurality of outlets in the head are arranged so as to cover an entire printing area on the printing medium with respect to the width direction and an image can be printed at higher speed. According to another aspect of the present invention, each of the plurality of outlets can form a plurality of dots having different sizes by ejecting different amounts of droplets, and each element value of the modified dither matrix is a set of sub-element values used for determination of a size of a dot. It is thereby possible to suppress occurrence of unevenness in the printer which comprises the head capable of forming dots having different sizes.

The present invention is also intended for a dither matrix generation method for generating a dither matrix compared with a grayscale original image when generating a halftone image from the original image in printing in an inkjet printer which comprises a head having a plurality of outlets arranged in a width direction perpendicular to a predetermined scan direction each of which ejects droplets of ink onto a printing medium, and a scanning mechanism for moving the printing medium relatively to the head in the scan direction and an electronic apparatus-readable recording medium in which data of a dither matrix is recorded.

These and other objects, features, aspects and advantages of the present invention will become more apparent from the following detailed description of the present invention when taken in conjunction with the accompanying drawings.

BRIEF DESCRIPTION OF THE DRAWINGS

FIG. 23 is a view showing the correction coefficients of the plurality of outlets;

FIG. 24 is a view to explain another example of a printing operation; and

FIG. 25 is a view showing another example of the head.

DESCRIPTION OF THE PREFERRED EMBODIMENTS

Figure 1:
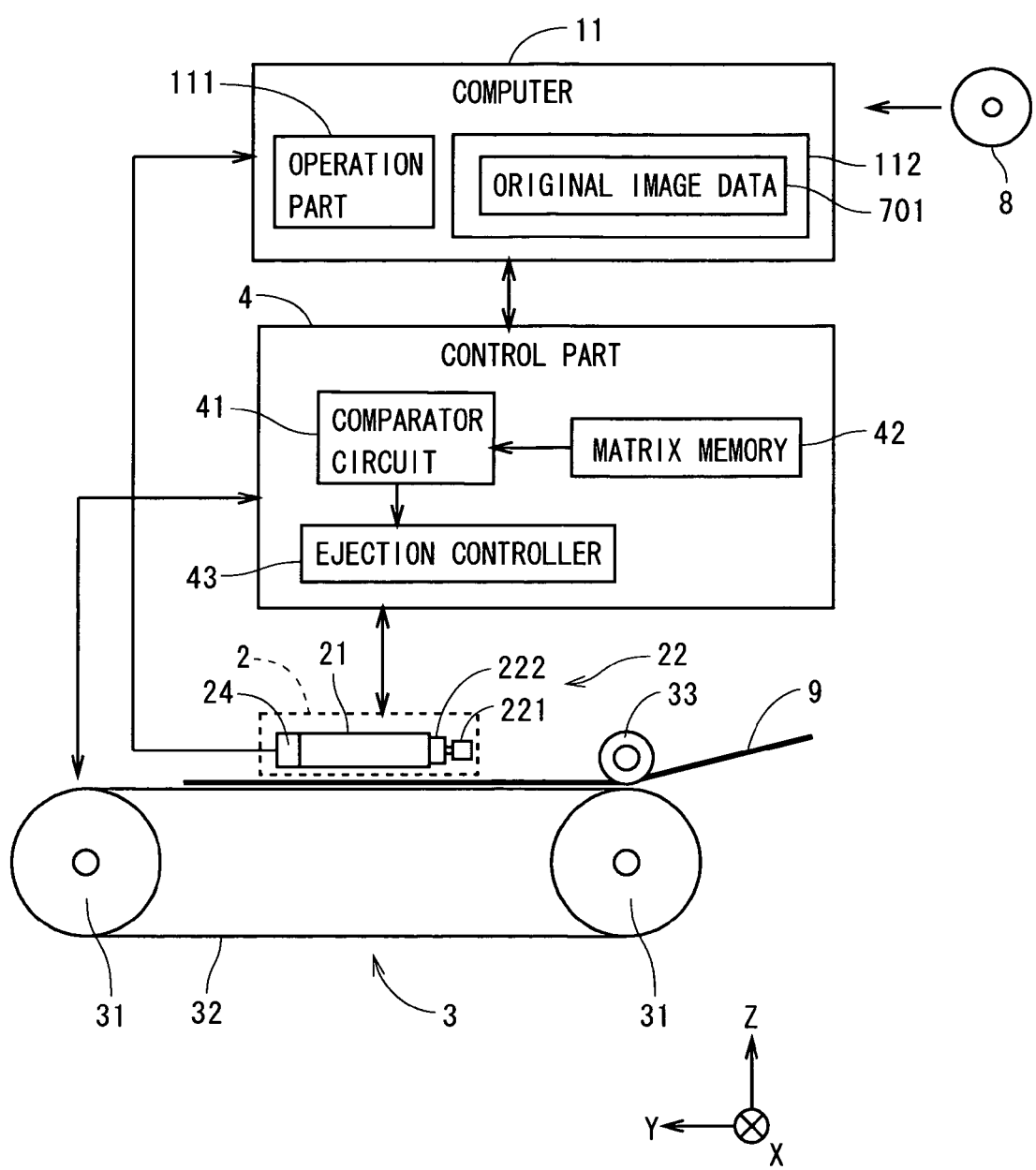
FIG. 1 is a view showing a constitution of an inkjet printer.

FIG. 1 is a view showing a construction of an inkjet printer 1 in accordance with one preferred embodiment of the present invention. The printer 1 comprises an ejection part 2 for ejecting fine droplets of ink onto a printing paper 9, a feeder 3 for moving the printing paper 9 toward the Y direction of FIG. 1 under the ejection part 2, a control part 4 connected to the ejection part 2 and the feeder 3, and a computer 11 having a CPU for performing various computations, a memory for storing various information, and the like.

The feeder 3 has two belt rollers 31 connected to a not-shown motor and a belt 32 hanging between the two belt rollers 31. The printing paper 9 is roll paper which is continuous paper with a predetermined width, and guided onto the belt 32 through a roller 33 positioned above the belt roller 31 on the (−Y) side and held there and moved toward the (+Y) side, passing under the ejection part 2 together with the belt 32. One belt roller 31 of the feeder 3 is provided with an encoder (not shown). The feeder 3 may have a construction where a suction part is provided at a position opposite to the ejection part 2 inside the loop-like belt 32 and very small suction holes are formed on the belt 32, to hold the printing paper 9 on the belt 32 by suction.

A head 21 having a plurality of modules is provided in the ejection part 2, and as discussed later a plurality of outlets each of which ejects droplets of ink onto the printing paper 9 are formed in each module. A density measurement part 24 for measuring densities of a pattern on the printing paper 9 which is printed by the head 21 is attached on the (+Y) side of the head 21, and the density measurement part 24 has a plurality of light receiving elements (for example, CCD (Charge Coupled Devices)) arranged in the Y direction. The ejection part 2 comprises a head moving mechanism 22 for moving the head 21 in a direction perpendicular to a scan direction of the head 21 and along the printing paper 9 (the direction is the X direction in FIG. 1 and corresponding to the width of the printing paper 9, and hereinafter referred to as "width direction"). The head moving mechanism 22 is provided with a loop-like timing belt 222 which is long in the X direction, and a motor 221 cyclically moves the timing belt 222 and the head 21 smoothly moves in the width direction. While printing is not performed in the printer 1, the head moving mechanism 22 disposes the head 21 at a predetermined home position and the plurality of outlets in the head 21 are closed with lib members at the home position, to prevent the outlets from being blocked by drying of the ink in the vicinity of the outlets.

Figure 2:
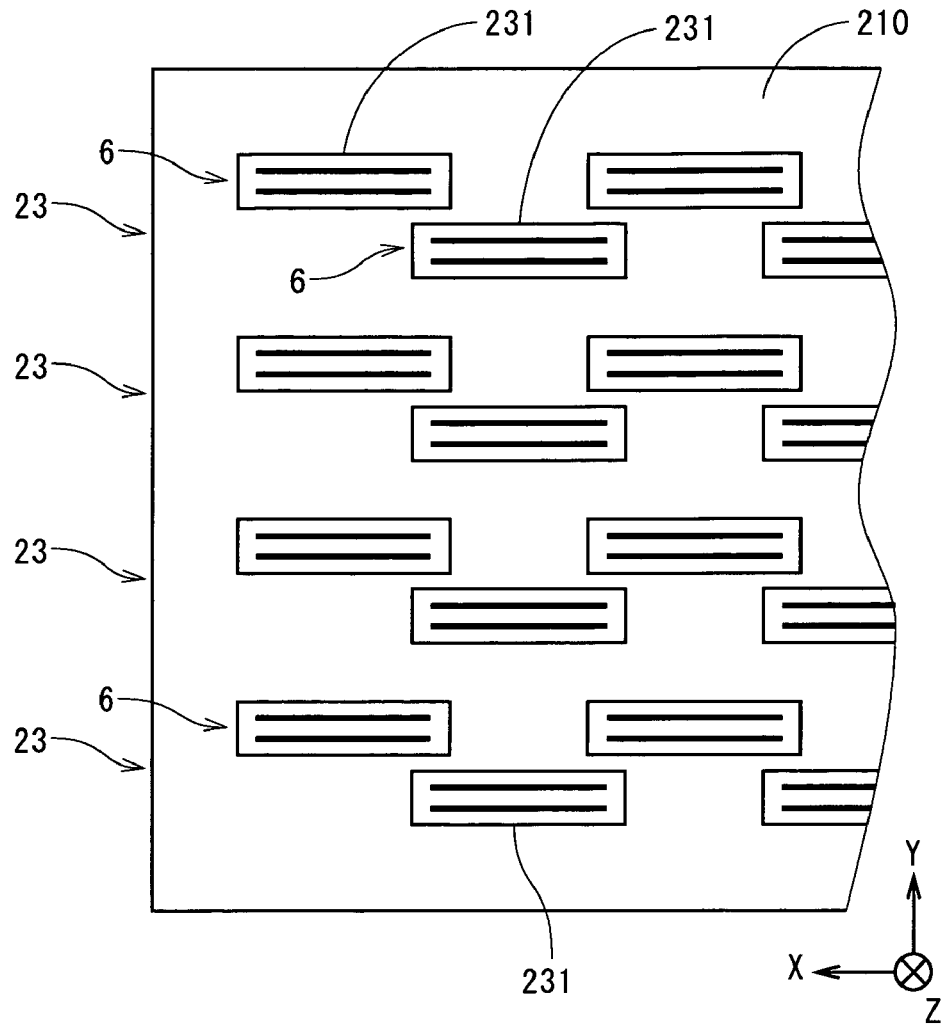
FIG. 2 is a bottom plan view showing a construction of a head.

FIG. 2 is a bottom plan view showing a construction of the head 21, which vertically shows the scan direction of the ejection part 2 relative to the printing paper 9 (i.e., the Y direction). The head 21 has an array of the plurality of modules 231 which are detachably attached to a head body 210. Specifically, the plurality of modules 231 arranged in two-row staggered arrangement along the X direction are set as one module group 23 and four module groups 23 are arranged in the scan direction. In each module group 23, the plurality of modules 231 are disposed in a whole range in the width direction (X direction) which is almost the same width as a printing area (i.e., an area actually printed) on the printing paper 9.

Each module 231 has an outlet group 6 which is a set of the plurality of outlets arranged in the width direction (one outlet group 6 is indicated by a double line in FIG. 2). The outlet group 6 of each module 231 included in the module group 23 on the (−Y) side ejects ink of K (black), the outlet group 6 of each module 231 included in the module group 23 on the (+Y) side of the module group 23 of K ejects ink of C (cyan), the outlet group 6 of each module 231 included in the module group 23 on the (+Y) side of that of C ejects ink of M (magenta), and the outlet group 6 of each module 231 included in the module group 23 on the (+Y) side of that of M (i.e., the module group 23 located at the end on the (+Y) side) ejects ink of Y (yellow). Each outlet can form a plurality of dots having different sizes by ejecting different amounts of droplets, and in the preferred embodiment, any one of a dot of S size which is the smallest one, a dot of M size which is larger than S size, and a dot of L size which is larger than M size can be formed as one dot.

Figure 3:
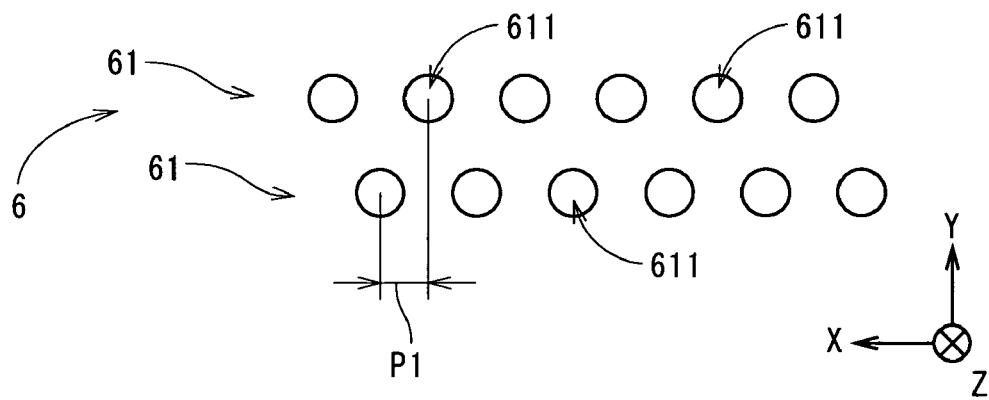
FIG. 3 is a view showing an outlet group of a module.

FIG. 3 is a view showing the outlet group 6 of one module 231. Though the following discussion will be made on only the module group 23 for ejecting ink of one of the four colors, i.e., CMYK, the module groups 23 for ejecting ink of other colors have the same construction.

As shown in FIG. 3, the outlet group 6 has two outlet rows 61 arranged in the Y direction (scan direction) in each of which the plurality of outlets 611 are arranged in the X direction (width direction). In each outlet row 61, the plurality of outlets 611 are arranged at a regular pitch toward the width direction in a plane parallel to the printing paper 9 (the plane parallel to the XY plane). In the outlet group 6, the plurality of outlets 611 are disposed in two-row staggered arrangement so that one of the outlets 611 in one outlet row 61 is positioned at the center between two adjacent outlets 611 in the other outlet row 61 with respect to the width direction. Therefore, in one module 231, the plurality of outlets 611 are arranged at a regular pitch P1 with respect to the width direction (for example, the pitch is 35 micrometers (μm) corresponding to 720 dpi (dot per inch) and hereinafter also referred to as "ejection pitch P1"). A pitch of the plurality of outlets 611 in the width direction may be finely adjusted by slightly rotating each module 231 in the head 21 about an axis parallel to the Z axis.

In the module group 23, a center-to-center distance in the width direction between the outlet 611 at the end on the (−X) side in each module 231 (except for the module 231 at the end on the (−X) side) and the outlet 611 at the end on the (+X) side in a module 231 located on the (−X) side of the each module 231 (the module 231 is located on a different position from the each module 231 in the Y direction) (hereinafter, each of the above outlets 611 is also referred to as "adjacent outlet") is shorter than the ejection pitch P1 (see FIG. 11 discussed later). Specifically, in assembling the head 21, a center-to-center distance in the width direction of two adjacent outlets 611 between two adjacent modules 231 with respect to the width direction is set to a distance which is shorter than the ejection pitch P1 (for example, the distance is 20 μm relatively to the ejection pitch P1 of 35 μm), and the plurality of modules 231 are attached on the head body 210 with certain accuracy. With this structure, even if there are errors in attachment of the modules 231, the center-to-center distance in the width direction of the two adjacent outlets 611 is equal to or longer than 0 and shorter than the ejection pitch P1, and it is possible to prevent the center-to-center distance from being longer than the ejection pitch P1. Actually, a rate of the adjacent outlets 611 in the plurality of outlets 611 included in each module group 23 is very small, and macroscopically, the plurality of outlets 611 are arranged at the regular pitch P1 in the module group 23 so as to cover the entire printing area on the printing paper 9 with respect to the width direction (i.e., to cover the range which is equal to or wider than the effective print area on the printing paper 9).

In the preferred embodiment, the width of the printing paper 9 is 20 inch (508 millimeters (mm)), each module group 23 of the head 21 includes 20 modules 231 in each of which the outlets 611 are arranged in a width of 1 inch and in each module 231, 720 outlets 611 are arranged at the ejection pitch corresponding to 720 dpi. In other words, in the head 21, 14400 (calculated from (20×720)) outlets 611 are provided in the width direction for each of the four colors CMYK, being opposed to the printing paper 9 having 20-inch width.

In the computer 11 of FIG. 1, by executing a predetermined program, implemented is a function of an operation part 111 for generating a dither matrix which is compared with a grayscale original image (that is an image to be written and has density levels of 256 from 0 to 255 in the preferred embodiment) when generating a halftone image from the original image (i.e., performing halftoning) in printing. An original image data 701 is stored in a memory 112 of the computer 11. The control part 4 comprises a matrix memory 42 which is a memory for storing the dither matrix generated in the operation part 111, a comparator circuit 41 (a halftoning circuit) comparing the original image with the dither matrix, and an ejection controller 43 for controlling ejection of ink from the plurality of outlets 611 in the head 21, in synchronization with movement of the printing paper 9 relative to the head 21.

Next, discussion will be made on a printing operation in the printer 1. When printing is performed in the printer 1, first, a dither matrix used for an actual printing is prepared (the dither matrix is prepared by modifying a basic dither matrix and hereinafter referred to as "modified dither matrix" for distinction from the basic dither matrix) and stored in the matrix memory 42. Though the following discussion will be made on only the modified dither matrix for one color of four modified dither matrixes prepared for the four colors, i.e., CMYK, respectively, the modified dither matrix for each of the other colors has the same data construction to be used in the same manner.

Figure 4:
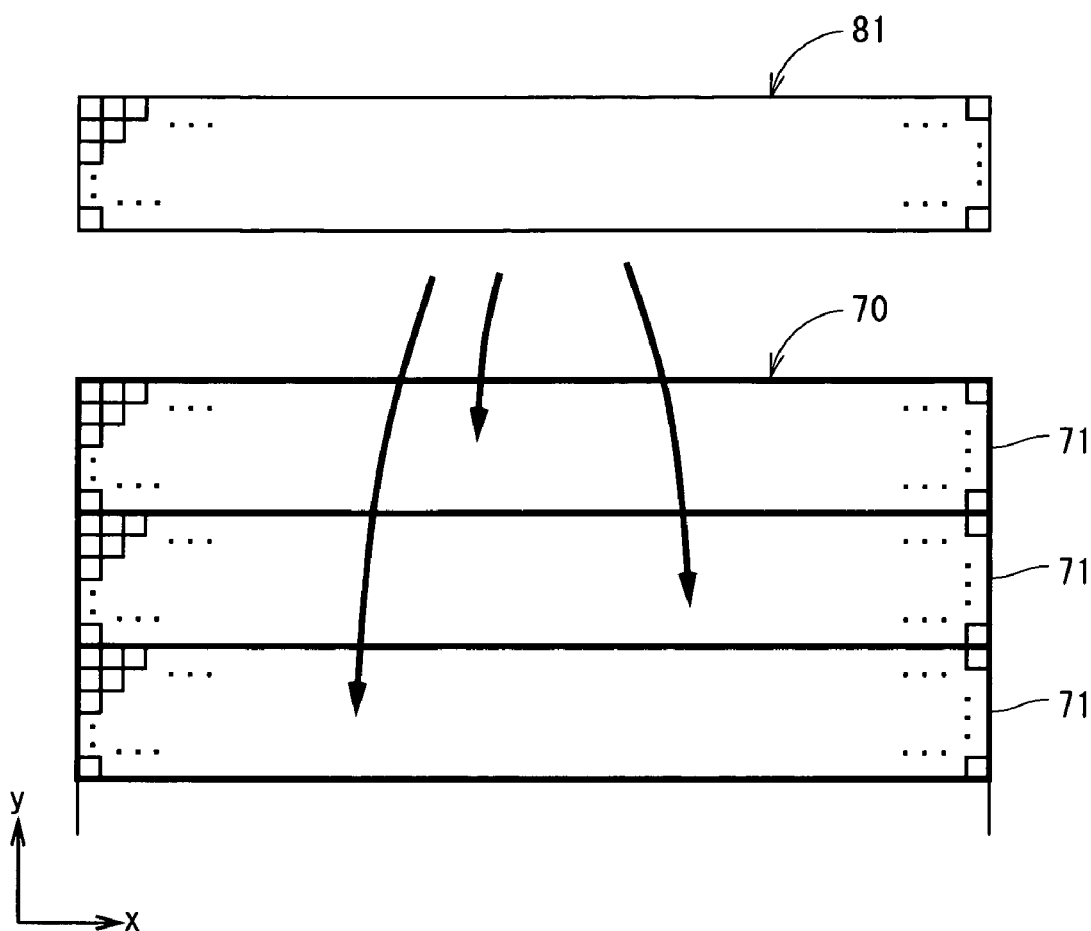
FIG. 4 is a view showing a modified dither matrix and an original image.

FIG. 4 is a view showing a modified dither matrix 81 and an original image 70 abstractly. The modified dither matrix 81 is a two-dimensional array where a plurality of element values are arranged in a column direction (represented as the y direction in FIG. 4) corresponding to the scan direction and a row direction (represented as the x direction in FIG. 4) corresponding to the width direction, the number of positions in the row direction (i.e., the number of elements arranged in the row direction) is the same as that of the plurality of outlets 611 of each module group 23 in the head 21, and the plurality of positions in the row direction are associated with the plurality of outlets 611, respectively. The number of positions in the column direction of the modified dither matrix 81 (i.e., the number of elements arranged in the column direction) is 256 in the preferred embodiment, and the modified dither matrix 81 is the array of the element values in 256 rows and 14400 columns, elongating in the row direction. An operation for generating the modified dither matrix will be discussed later.

Subsequently, in the comparator circuit 41 of FIG. 1, a halftone image is generated from the original image 70 inputted from the computer 11 with using the modified dither matrix 81. In the following description, a basic process for halftoning of the original image 70 in the printer 1 will be explained first, and then, an actual process of halftoning in the printer 1 will be explained.

In the original image 70, the number of pixels in a direction corresponding to the width direction (hereinafter, the direction is referred to as the row direction like the modified dither matrix 81) is the same as that of the positions in the row direction of the modified dither matrix 81 (or the original image 70 is converted so that the number of pixels in the row direction of the original image 70 becomes equal to that of the positions in the row direction of the modified dither matrix 81). The original image 70 is divided in a direction corresponding to the scan direction (hereinafter, the direction is referred to as the column direction like the modified dither matrix 81), and each of the divided areas is set as a repeat area 71 (represented by thick lines in FIG. 4) which is a unit of halftoning. At this time, since the length in the column direction of the repeat area 71 is the same as that in the column direction of the modified dither matrix 81, the plurality of pixels included in one repeat area 71 correspond to the plurality of elements in the modified dither matrix 81, respectively.

Figure 5:
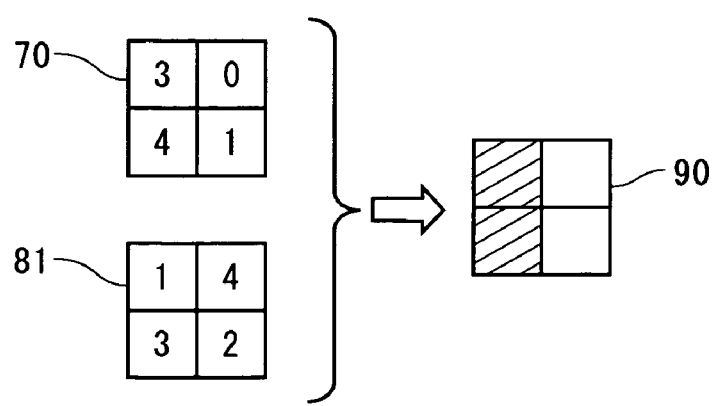
FIG. 5 is a view to explain halftoning of the original image.

In halftoning of the original image, a pixel value of each pixel (a density level of each pixel) in the repeat area 71 of the original image is compared with an element value of the modified dither matrix 81 corresponding to the pixel value, to determine a pixel value at the position (address) of the above pixel in a binary outputted image. Therefore, in (a part of) the original image 70 shown in FIG. 5, for example, a pixel value "1" is assigned (i.e., a dot is set) at each of positions where a pixel value is larger than the element value of the modified dither matrix 81 corresponding to the pixel values, and a pixel value "0" is assigned (i.e., a dot is not set) at each of remaining pixels, to generate a binary outputted image 90 after halftoning. In the outputted image 90 of FIG. 5, pixels where dots are set are hatched.

Figure 6:
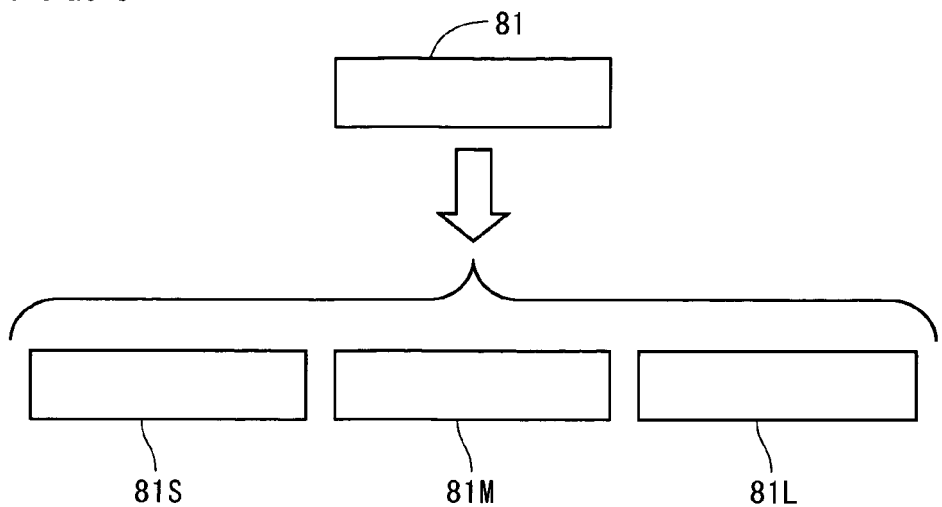
FIG. 6 is a view to explain a relationship between the modified dither matrix and sub-modified matrixes.

Next discussion will be made on an actual operation of halftoning in the printer 1. As discussed above, each of the plurality of outlets 611 in the head 21 can form the plurality of dots having the different sizes (S size, M size and L size) by ejecting different amounts of droplets and actually, each element value of the modified dither matrix 81 is a set of sub-element values used for determination of a size of a dot. Specifically, each element value of the modified dither matrix 81 has a sub-element value for determining necessity of formation of a dot with S size, a sub-element value for determining necessity of formation of a dot with M size, and a sub-element value for determining necessity of formation of a dot with L size. Hence, as shown in FIG. 6, the modified dither matrix 81 can be regarded as a set of a sub-modified matrix 81S which is a two-dimensional array of the sub-element values for S size, a sub-modified matrix 81M which is a two-dimensional array of the sub-element values for M size, and a sub-modified matrix 81L which is a two-dimensional array of the sub-element values for L size. The number of arrangements of the sub-element values in each of the sub-modified matrixes 81S, 81M and 81L is the same as that of the element values in the modified dither matrix 81. Out of the mutually corresponding sub-element values in the sub-modified matrixes 81S, 81M and 81L, the smallest value is in the sub-modified matrix 81S for S size and the largest value is in the sub-modified matrix 81L for L size. Features of the sub-modified matrixes 81S, 81M and 81L will be described in a generation process of the modified dither matrix which is discussed later.

In the actual halftoning in the printer 1, the above-discussed basic operation of halftoning is performed on each of the sub-modified matrixes 81S, 81M and 81L. Specifically, first, a pixel value of each pixel in the repeat area 71 of the original image 70 is compared with a sub-element value of the sub-modified matrix 81S for S size corresponding to the pixel value. In the original image 70, pixels at the positions where the pixel values are larger than the corresponding sub-element values of the sub-modified matrix 81S, for example, are assigned the pixel values "1" and the remaining pixels are assigned the pixel values "0", to generate a provisional outputted image. Subsequently, the pixel value of each pixel in the repeat area 71 of the original image 70 is compared with the corresponding sub-element value of the sub-modified matrix 81M for M size, and pixels in the outputted image at the positions where the pixel values are larger than the corresponding sub-element values of the sub-modified matrix 81M are changed to the pixel values "2" and the remaining pixels keep the pixel values "0", to modify the provisional outputted image. Then, the pixel value of each pixel in the repeat area 71 of the original image 70 is compared with the corresponding sub-element value of the sub-modified matrix 81L for L size, and pixels in the outputted image at the positions where the pixel values are larger than the corresponding sub-element values of the sub-modified matrix 81L are changed to the pixel values "3" and the remaining pixels keep the pixel values "0", to acquire a quaternary outputted image which is comparison results between the pixel values in the repeat area 71 of the original image 70 and the corresponding element values of the modified dither matrix 81. As discussed later, since the pixel values "1", "2" and "3" in the outputted image indicate the size of dot which is formed on the printing paper 9 by the corresponding outlet 611, the outputted image is substantially a halftone image represented by the absence or presence of dot (and size of dot).

As discussed earlier, out of the corresponding sub-element values, the smallest one is in the sub-modified matrix 81S for S size and the largest one is in the sub-modified matrix 81L for L size in the preferred embodiment. Thus, when a pixel value of a pixel in the original image 70 is equal to or smaller than the corresponding sub-element value of the sub-modified matrix 81S in comparison between the original image 70 and the sub-modified matrix 81S for S size, the pixel value is always equal to or smaller than the corresponding sub-element values of the sub-modified matrix 81M for M size and the sub-modified matrix 81L for L size. When a pixel value of a pixel in the original image 70 is equal to or smaller than the corresponding sub-element value of the sub-modified matrix 81M, the pixel value is always equal to or smaller than the corresponding sub-element value of the sub-modified matrix 81L for L size. Comparing such pixel values of pixels in the original image 70 with the corresponding sub-element values of the sub-modified matrixes 81M and 81L may be omitted.

In the printer 1 of FIG. 1, the head 21 moves to a predetermined printing position in the X direction from the home position by driving the head moving mechanism 22 in parallel with the above process of halftoning. When the outputted image of the area which is firstly printed in the original image 70 (for example, the repeat area 71 located at the end on the (+y) side) is generated for each of the four colors CMYK, the control part 4 controls the feeder 3 and continuous movement toward the scan direction of the printing paper 9 is started, and in parallel with the above process of halftoning (the generation process of the outputted image), ejection of ink from the plurality of outlets 611 included in each module group 23 is controlled by the ejection controller 43 in synchronization with movement of the printing paper 9 relative to the head 21.

Since the outputted image is an image printed on the printing paper 9, the plurality of pixels in the outputted image are considered to be arranged on the printing paper 9. As described above, the plurality of positions in the row direction in the modified dither matrix 81 are individually (one by one) associated with the plurality of outlets 611 in the head 21 and similarly in the outputted image, the plurality of positions in the row direction are associated with the plurality of outlets 611, respectively.

Hence, in the ejection controller 43, in synchronization with movement of the printing paper 9 relative to the head 21, when a pixel value in the outputted image corresponding to an ejection position of each outlet 611 on the printing paper 9 is "1", a dot of S size is formed on the ejection position, and when the pixel value in the outputted image is "2", a dot of M size is formed on the ejection position. Also, when the pixel value in the outputted image is "3", a dot of L size is formed on the ejection position, and when the pixel value in the outputted image is "0", a dot is not formed on the ejection position. In this way, in synchronization with movement of the printing paper 9 relative to the head 21 (scanning of the plurality of ejection positions on the printing paper 9 associated with the plurality of outlets 611, respectively), ejection of ink from the plurality of outlets 611 is controlled in accordance with comparison results between the pixel values of the original image 70 at the ejection positions of the plurality of outlets 611 relative to the printing paper 9 and the element values of the modified dither matrix 81 corresponding to the pixel values, to print a halftone image on the printing paper 9 at a resolution of about 720 dpi in both the scan direction and the width direction.

At this time, in the head 21, the distance in the width direction between the two adjacent outlets 611 of the two adjacent modules 231 in the width direction is prevented from being longer than the ejection pitch P1 and this surely prevents the case where the distance in the width direction between the two adjacent outlets 611 becomes longer than the ejection pitch P1 and a space (a bleary white line) extending in the scan direction appears in a printed image.

After the above process is continuously performed and the whole original image 70 is printed on the printing paper 9, movement toward the scan direction of the printing paper 9 is stopped, the head moving mechanism 22 moves the head 21 to the home position, and the printing operation is completed in the printer 1.

Next, referring to FIG. 7, discussion will be made on a generation process of the modified dither matrix 81. Generation of the modified dither matrix 81 is normally performed in manufacturing the printer 1 as discussed below but may be performed except manufacturing of the printer 1, and a part of the operations in FIG. 7 (Steps S5 to S8) can be performed as, for example, an adjusting operation in installing the printer 1 in a use site, a regular calibration in the use of the printer 1, or the like, as discussed later.

In generation of the modified dither matrix 81, first, prepared is a dither matrix which is a two-dimensional array where a plurality of threshold values are arranged, for example, in 256 rows and 256 columns (the dither matrix has a different size from the modified dither matrix 81 which is actually used in printing, and hereinafter referred to as "threshold matrix" for distinction from the modified dither matrix 81) (Step S1). The threshold matrix is a square matrix which is a partial basis of the modified dither matrix 81 used in printing in the printer 1. In the preferred embodiment, a value (a threshold value) of each element in the threshold matrix is one of 0 to 255, and elements having the same value are almost uniformly distributed in the threshold matrix. Though such a threshold matrix may be generated by various techniques, an exemplary method for generating a preferable threshold matrix will be discussed after the descriptions of the preferred embodiment and other example in accordance with modification of an element value which is later discussed.

Figures 8A, 8B, 8C, 8D, 9:
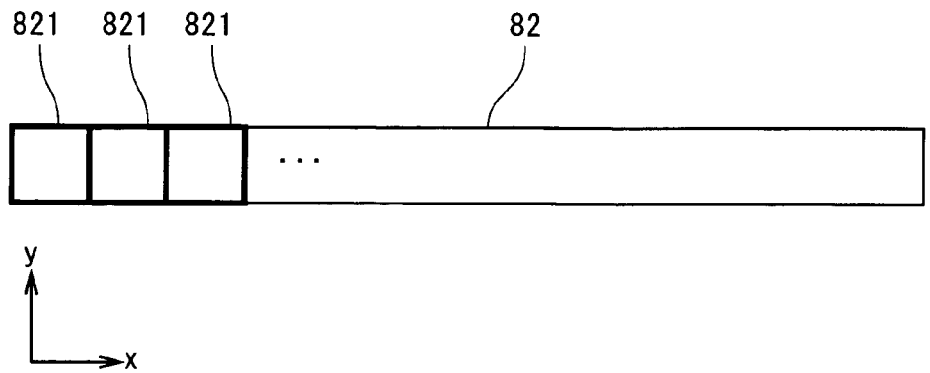
FIGS. 8A to 8D are views showing threshold matrixes for CMYK.
FIG. 9 is a view to explain expansion of the threshold matrix.

In the operation part 111, a threshold matrix for each of the four colors CMYK is generated from the threshold matrix (Step S2). Suppose that a threshold matrix 821C in two rows and two columns is prepared as shown in FIG. 8A (actually, a large number of values are arranged in the threshold matrix), a position of each element is changed by clockwise rotation of the whole threshold matrix 821C around the center thereof by 90 degrees, to obtain a threshold matrix 821M shown in FIG. 8B. In the same way, a position of each element is changed by clockwise rotation of the whole threshold matrix 821C of FIG. 8A around the center thereof by 180 degrees, to obtain a threshold matrix 821Y shown in FIG. 8C, and a position of each element is changed by clockwise rotation of the whole threshold matrix 821C of FIG. 8A around the center thereof by 270 degrees, to obtain a threshold matrix 821K shown in FIG. 8D. These threshold matrixes 821C, 821M, 821Y and 821K are used for C, M, Y and K, respectively. Actually, since the threshold matrix 821C is a two-dimensional array in 256 rows and 256 columns, each of the threshold matrixes 821M, 821Y and 821K is also a two-dimensional array in 256 rows and 256 columns. Though the following discussion will be made on only the threshold matrix for one of the four colors CMYK with assigning a reference sign 821, the threshold matrix for each of the other colors is processed in the same manner. In the above description, the matrix for each color is obtained by rotating the threshold matrix every 90 degrees, but a reversed pattern or a pattern whose row or column is displaced (shifted) may be used as the matrix for each color.

Subsequently, as shown in FIG. 9, the threshold matrix 821 in 256 rows and 256 columns is repeatedly arranged (tiled) in the row direction (the x direction in FIG. 9) to generate an expanded matrix 82 in 256 rows and 14400 columns (Step S3). Similarly in the matrix 82, a value (a threshold value) of each element is one of 0 to 255. Elements of the threshold matrix 821 located at an end in the row direction out of the threshold matrixes 821 which are repeatedly arranged in the matrix 82 are partially used (i.e., only a part of the elements is used.).

After generation of the matrix 82 in 256 rows and 14400 columns, a matrix where a quotient obtained by dividing a value of each element in the matrix 82 by 2 is used as a new value of the element is generated as a matrix for formation of dot with S size. In the matrix for formation of dot with S size, a value of each element is one of 0 to 127. The value 64 which is 25% of 256 density levels in the original image 70 is added to the value of each element of the matrix for formation of dot with S size to generate a matrix for formation of dot with M size, and the value 128 which is 50% of 256 density levels in the original image 70 is added to the value of each element of the matrix for formation of dot with S size to generate a matrix for formation of dot with L size. A value of each element is one of 64 to 191 in the matrix for formation of dot with M size and in the matrix for formation of dot with L size, a value of each element is one of 128 to 255. In this way, the matrix 82 is converted to generate the matrix for formation of dot with S size, the matrix for formation of dot with M size, and the matrix for formation of dot with L size (Step S4).

A plurality of values are arranged in 256 rows and 14400 columns in each of the matrix for formation of dot with S size, the matrix for formation of dot with M size, and the matrix for formation of dot with L size and through the above operation of Step S4, prepared is a dither matrix where a set of three values located at the same position in the above matrixes is an element value at the position (the dither matrix is a basis of the modified dither matrix 81 which is generated later, and hereinafter referred to as "basic dither matrix"). That is to say, each value of the matrix for formation of dot with each size is a sub-element value relative to the corresponding element value of the basic dither matrix. In the following description, the matrix for formation of dot with each size is referred to as a sub-basic dither matrix.

Figure 10:
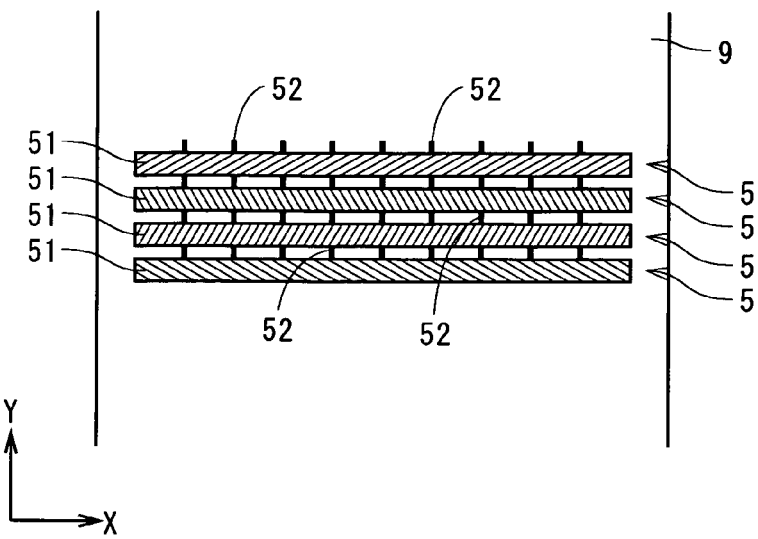
FIG. 10 is a view showing check patterns printed on a printing paper.

After preparing the basic dither matrix, the head 21 of FIG. 1 moves to the printing position and predetermined check patterns are printed on the printing paper 9 with using the basic dither matrix (Step S5). FIG. 10 is a view showing check patterns 5 printed on the printing paper 9. The check pattern 5 is for obtaining correction coefficients used in generation of the modified dither matrix 81 and formed for each of the four colors CMYK. As shown in FIG. 10, four check patterns 5 of CMYK are arranged in the Y direction. Each check pattern 5 has a pattern element 51 which is a liner portion extending to cover the almost entire printing area on the printing paper 9 with respect to the width direction and used for measurement of densities and a plurality of position indicating parts 52 located away on the (+Y) side of the pattern element 51 (located at a different position in the Y direction from the pattern element 51), slightly extending in the Y direction. The pattern element 51 is formed in a setting for a uniform density, using all the outlets 611 included in the corresponding module group 23. Each position indicating part 52 is formed by two adjacent outlets 611a between two modules 231 which are adjacent with respect to the width direction (see FIG. 11 discussed later). In FIG. 10, the number of position indicating parts 52 is smaller than the number of ones actually formed on the printing paper 9 for convenience of illustration (same as in FIG. 14 discussed later).

The check patterns 5 on the printing paper 9 move to a position under the density measurement part 24, the head 21 is moved in the (+X) direction by the head moving mechanism 22, and then densities of the pattern element 51 of each check pattern 5 are measured in the whole pattern element 51 in the width direction by the plurality of light receiving elements of the density measurement part 24, which are arranged in the scan direction at a position slightly away on the (−X) side from the plurality of outlets 611 with respect to the width direction (Step S6). At this time, since the plurality of position indicating parts 52 in each check pattern 5 are detected by the density measurement part 24, positions of regions corresponding to the adjacent outlets 611a can be accurately specified in the pattern element 51. As a result, in the pattern element 51, densities of regions formed by the adjacent outlets 611a are acquired with high accuracy and densities of regions formed by other outlets 611a are acquired at a constant accuracy. Actually, light receiving elements of the density measurement part 24 correspond to positions in the Y direction of one pattern element 51, respectively, and a density of a region corresponding to each outlet 611 in the pattern element 51 is acquired by each of the light receiving elements. Though the following discussion will be made on only the check pattern 5 (and the outlets 611) for one color, the check pattern 5 for each of the other colors is processed in the same manner.

When the densities of the pattern element 51 are measured by the density measurement part 24, in each position in the width direction of the pattern element 51 (i.e., the position associated with each outlet 611), an average value of the measured values of the densities which are acquired by corresponding light receiving elements is calculated as a density value in the operation part 111 of FIG. 1. With this operation, a plurality of density values are obtained for the plurality of outlets 611 included in the module group 23 (for each color), respectively. In the plurality of outlets 611 (excepting the adjacent outlet 611a and the outlets 611 near the adjacent outlet 611a) included in each module 231, an average value of the density values is obtained every predetermined number of (for example, ten) outlets 611 which are continuously arranged in the width direction, and the obtained average value is a print density for the predetermined number of outlets 611. In this way, by smoothing the measured values of densities, effects of noises can be reduced in measuring the densities. In the adjacent outlet 611a and the outlets 611 near the adjacent outlet 611a (for example, five outlets 611 which are continuous in the width direction from the adjacent outlet 611a), density values (average values of measured values of densities acquired by the corresponding light receiving elements) are used as print densities. Therefore, a level of smoothing of measurement results is reduced in measuring densities of vicinities of portions corresponding to the adjacent outlets 611a in the pattern element 51 of each check pattern 5, in comparison with measuring densities of portions corresponding to the other outlets 611.

Figure 11:
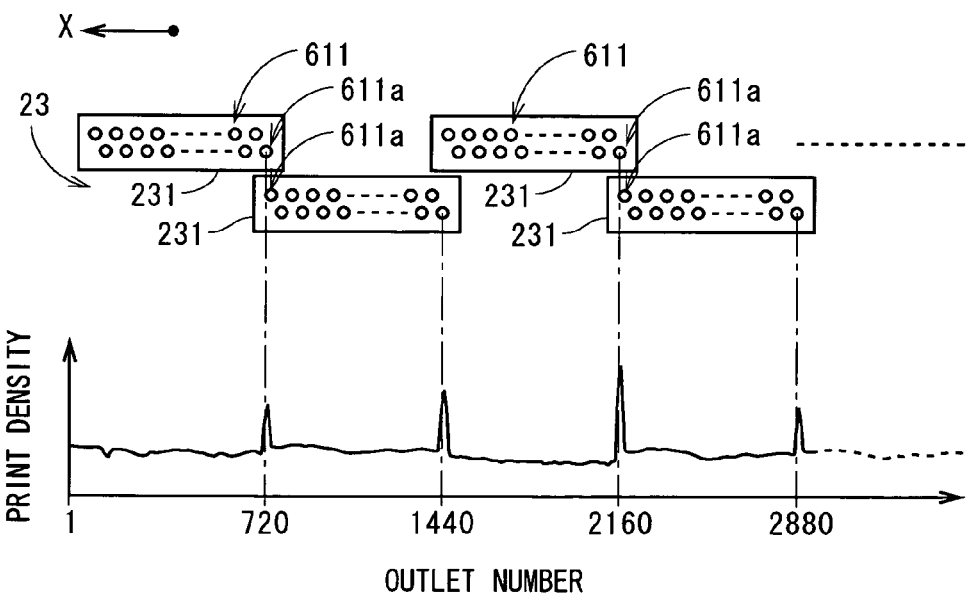
FIG. 11 is a view showing a relationship between a plurality of outlets and print densities.

FIG. 11 is a view showing a relationship between the plurality of outlets 611 included in a module group 23 and print densities. The upper part of FIG. 11 shows the outlets 611 included in each module 231 of the module group 23, and the lower part of FIG. 11 shows a print density with respect to each outlet 611. As discussed above, since in the head 21 of the printer 1, the distance in the width direction between the two adjacent outlets 611 (the outlets indicated by reference signs 611a in the upper part of FIG. 11) in the two adjacent modules 231 in the width direction (the X direction) is shorter than the ejection pitch P1 (see FIG. 3) (that is to say, the two adjacent outlets 611a substantially overlap with respect to the width direction), dots which are formed on the printing paper 9 by the above adjacent outlets 611a overlap in a large area and as shown in FIG. 11, densities of regions corresponding to the adjacent outlets 611a in the pattern element 51 are locally higher than those of other regions. Specifically, out of the 14400 outlets 611 arranged in the X direction, the 720th outlet and the 721st outlet from the (+X) side toward the (−X) direction are the adjacent outlets 611a, and subsequent adjacent outlets 611a are outlets whose numbers are integral multiples of 720 or integral multiples of 721.

In the operation part 111, the reciprocal of a value which is obtained by dividing the print density of each outlet 611 included in the module group 23 by a predetermined reference density value relative to the density level of the pattern element 51 is calculated to obtain a correction coefficient with respect to each outlet 611 (Step S7). The correction coefficient may be multiplied by a predetermined number or raised to a predetermined power for producing more effects of correction.

Figure 12:
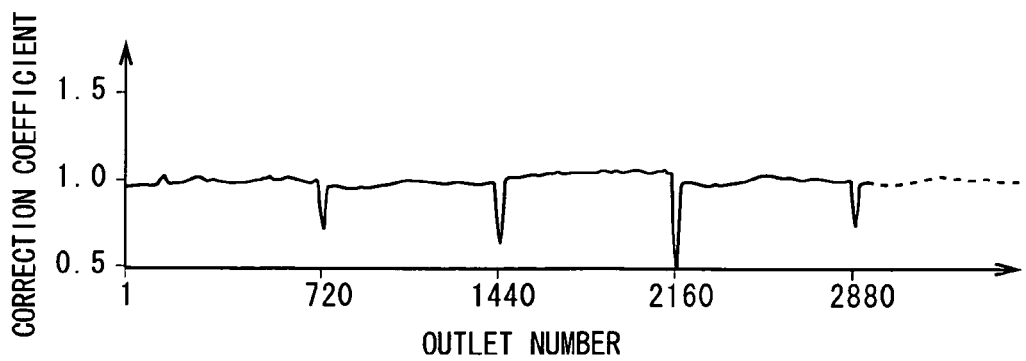
FIG. 12 is a view showing correction coefficients of the plurality of outlets.

FIG. 12 is a view showing the correction coefficient of each outlet 611 which is obtained based on the print density shown in the lower part of FIG. 11. In the above computation, when the print density is larger than the reference density value, the correction coefficient is smaller than 1 and when the print density is equal to or smaller than the reference density value, the correction coefficient is 1 or more.

Figure 13:
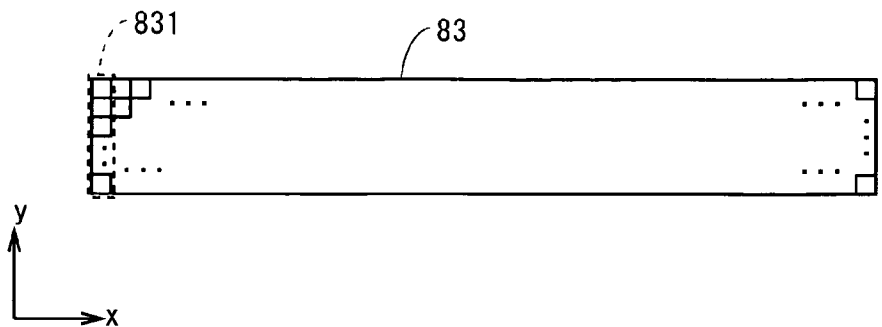
FIG. 13 is a view showing a basic dither matrix.

After obtaining the correction coefficient of each outlet 611, each element value of the basic dither matrix is divided by the corresponding correction coefficient to generate the modified dither matrix 81 (Step S8). For example, in a basic dither matrix 83 shown in FIG. 13, with respect to a plurality of element values arranged in the y direction (column direction) at the end on the (−x) side (the plurality of element values are surrounded by a broken-line rectangle 831 in FIG. 13 and hereinafter, the plurality of element values arranged in the column direction in a line are referred to as "element value column"), an element value column 831 corresponds to the outlet 611 at the end on the (−X) side in the plurality of outlets 611 included in the module group 23 and if the correction coefficient for the outlet 611 is set to 0.98 (i.e., if the density should be reduced by 2%), each element value included in the element value column 831 is divided by 0.98. Actually, since each element value is a set of sub-element values used for determination of a size of a dot (i.e., the basic dither matrix 83 is a set of sub-basic dither matrixes.), each sub-element value constituting the element value is divided by 0.98 to become larger than the original sub-element value.

When the correction coefficient for an outlet 611 is smaller than 1, the print density of the check pattern 5 is larger than the reference density value and the density of the region written by the outlet 611 needs to be reduced in printing the original image 70. Since in the modified dither matrix 81 each element value included in the element value column corresponding to the outlet 611 is made larger than the corresponding element value in the basic dither matrix 83, the probability that a dot is formed at the position in the width direction on the printing paper 9 associated with the outlet 611 (or the probability that a large dot is formed) is reduced in printing the original image 70. Therefore, in the image (printed image) which is actually printed on the printing paper 9 in printing the original image 70, the density of the region corresponding to the outlet 611 (the region extending in the scan direction) is practically reduced. On the other hand, when the correction coefficient for an outlet 611 is larger than 1, the print density of the check pattern 5 is smaller than the reference density value and therefore, in the modified dither matrix 81 each element value included in the element value column corresponding to the outlet 611 is made smaller than the corresponding element value in the basic dither matrix 83 and the density of the region corresponding to the outlet 611 (the region extending in the scan direction) is practically increased in the printed image on the printing paper 9 in printing the original image 70.

In this way, in the operation part 111, by dividing each element value in the basic dither matrix 83 by the corresponding correction coefficient, the plurality of element values in the basic dither matrix 83 are modified on the basis of variation in print densities with respect to the width direction caused by ejection from the plurality of outlets 611, to obtain the modified dither matrix 81 on which the shading compensation is practically performed. In the above process, in modification of the element values in each element value column, since correction coefficients obtained for different outlets 611 are used among the plurality of element value columns, the plurality of element values in the modified dither matrix 81 have a directional property in the column direction (have an anisotropy), and variation among the plurality of element value columns in the average values of the element values included in respective element value columns of the modified dither matrix 81 becomes larger than that among the plurality of element value columns in the average values of the element values included in respective element value columns of the basic dither matrix 83.

The generated modified dither matrix 81 is outputted and stored into the matrix memory 42, and it is used in halftoning of the original image 70 in printing.

As discussed above, in the printer of FIG. 1, the plurality of element values in the basic dither matrix 83 are modified on the basis of variation in print densities with respect to the width direction caused by ejection from the plurality of outlets 611 in the head 21 to generate the modified dither matrix 81. Printing is performed with the modified dither matrix 81, it is therefore possible to print an image at high speed and easily, where unevenness (mura) caused by variation in ejection amounts of the droplets from the plurality of outlets or the like is suppressed, without performing computations for the shading compensation in printing or providing a special electric circuit for the shading compensation.

In the printer 1, the center-to-center distance in the width direction of the two adjacent outlets 611a between each combination of the two adjacent modules 231 in the width direction is equal to or longer than 0 and shorter than the ejection pitch P1 in consideration of errors in setting of the modules 231, and each element value in the modified dither matrix 81 is modified on the basis of variation in print densities with respect to the width direction caused by ejection from the plurality of outlets 611 including such adjacent outlets 611a. As a result, it is possible to surely prevent the center-to-center distance of the two adjacent outlets 611a from being longer than the ejection pitch P1 because of errors in setting of the modules 231 and prevent a space extending in the scan direction from appearing in the printed image, and unevenness in the printed image caused by the center-to-center distance of the two adjacent outlets 611a can be suppressed.

Though a degree of correction is large in the element value corresponding to each adjacent outlet 611a in the unmodified dither matrix (the basic dither matrix 83) (see FIG. 12), since in the printer 1 the position indicating parts 52 are formed in each check pattern 5, it is possible to precisely specify the position in the pattern element 51 written by the adjacent outlet 611a, and accurately obtain the modified dither matrix 81 which is capable of suppressing unevenness in the printed image caused by the center-to-center distance of the two adjacent outlets 611a.

Figure 7:
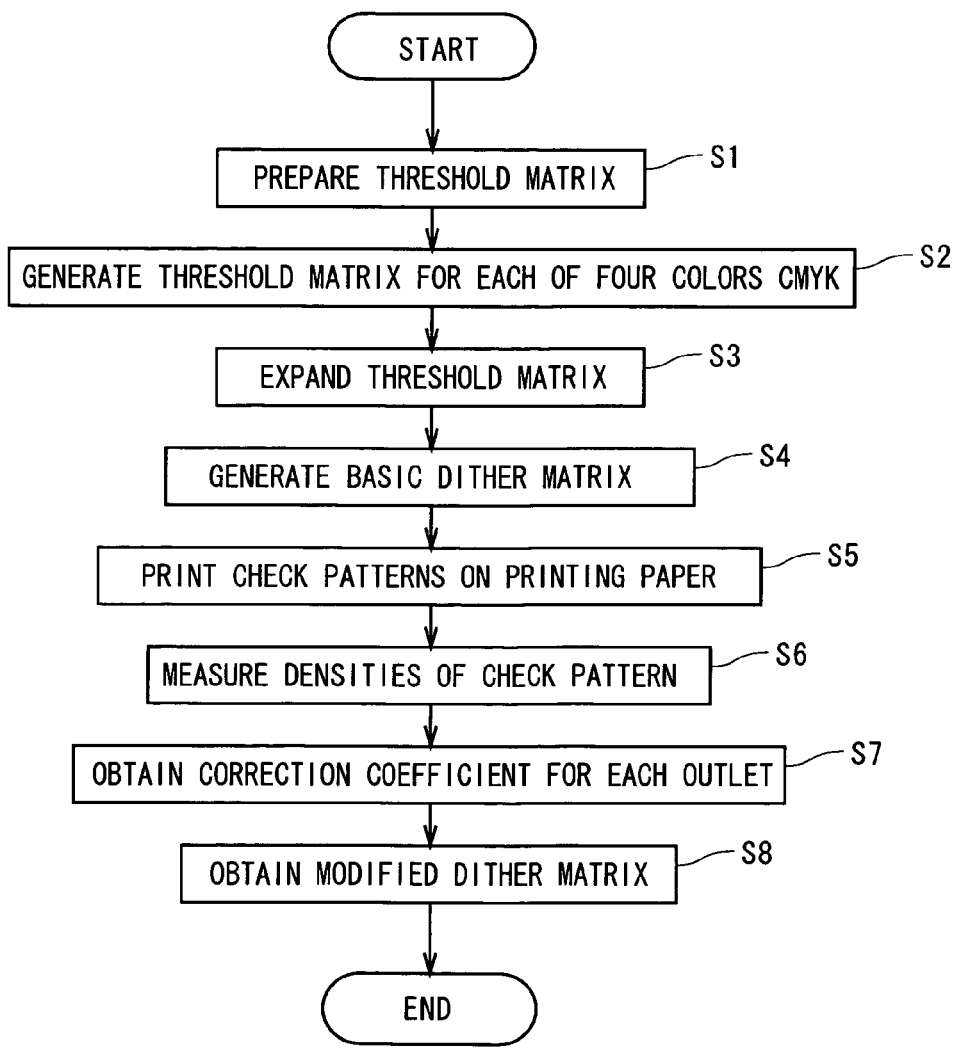
FIG. 7 is a flowchart showing an operation flow for generating the modified dither matrix.

As described above, in the printer 1, there may be a case where a part of the generation process of the modified dither matrix in FIG. 7 is performed as an adjusting operation in installing the printer 1 in a use site, a regular calibration in the use of the printer 1, or the like, to update the modified dither matrix 81. In this case, the modified dither matrix stored in the matrix memory 42 is used as the basic dither matrix (Step S4). After the check patterns are formed on the printing paper 9 (Step S5), densities of each pattern element are acquired (Step S6), the correction coefficient for each outlet 611 is obtained (Step S7), and a new modified dither matrix is obtained on the basis of the basic dither matrix and the measurement results of the densities (Step S8). Even in a case where the states of the plurality of outlets 611 in the head 21 or the mutual positional relationships in the plurality of modules 231 change in installing of an apparatus or in accordance with passage of operating time of an apparatus, or the like, it is possible to stably print an image where unevenness is suppressed, with using a new modified dither matrix in which the plurality of element values are appropriately modified on the basis of variation in print densities with respect to the width direction caused by ejection from the plurality of outlets 611.

In this case, in the printer 1, the first basic dither matrix 83 directly derived from the threshold matrixes 821 may be always stored in the memory 112 of the computer 11. If this is the case, when the modified dither matrix is updated, the check patterns are formed on the printing paper 9 with using the above basic dither matrix 83 and a new correction coefficient for each element value in the first basic dither matrix 83 is acquired to obtain a new modified dither matrix. That is to say, generation of the new modified dither matrix may be performed as updating of the correction coefficients for the first basic dither matrix 83.

Though in the printer 1 the operation part 111 modifies each element value in the basic dither matrix 83 on the basis of the measurement results by the density measurement part 24 and the modified dither matrix 81 is easily obtained in the printer 1, an external computer of the printer 1 executes a predetermined program, whereby the same function as the operation part 111 is achieved, and each element value in the basic dither matrix may be modified on the basis of inputs of the measurement results of the check pattern from the density measurement part 24 to generate the modified dither matrix. In this case, there may be a case where data of the generated modified dither matrix is inputted to the control part 4, for example, through a computer network or by storing it into a computer-readable/writable recording medium such as an optical disk, a magnetic disk, and a magneto-optic disk and reading the recording medium (indicated by the reference sign 8 in FIG. 8) with a reader (not shown) of the computer 11 in the printer 1, and then the modified dither matrix is stored in the matrix memory 42 (same as in an exemplary operation which is discussed later with reference to FIGS. 14 and 15). The recording medium 8 may be read by a reader provided in the control part 4. In other words, the recording medium 8 is an electronic apparatus-readable/writable one.

Next discussion will be made on another preferable exemplary operation for modifying each element value of the basic dither matrix 83. Also in this operation, after the basic dither matrix 83 is generated (FIG. 7: Step S4), the check patterns are printed on the printing paper 9 with using the basic dither matrix 83 (Step S5).

Figure 14:
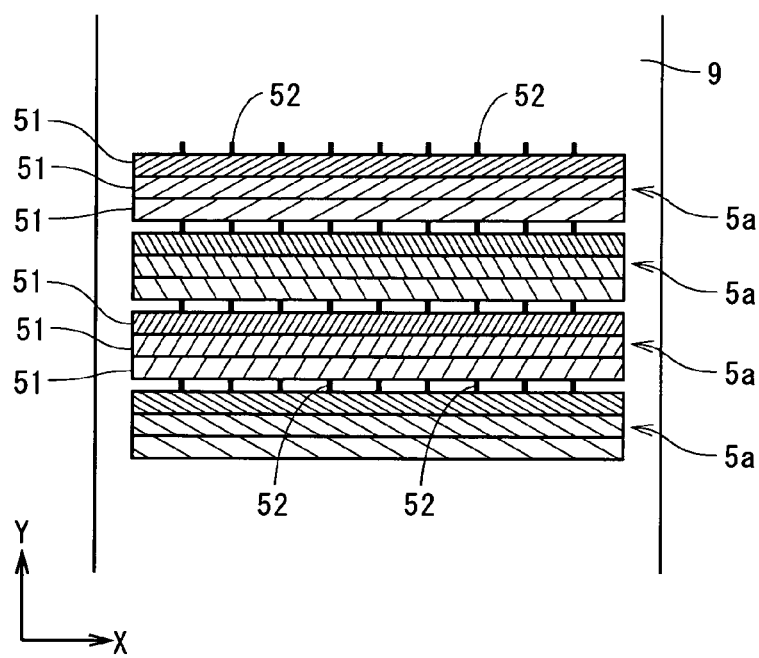
FIG. 14 is a view showing other exemplary check patterns printed on the printing paper.

FIG. 14 is a view showing check patterns 5a printed on the printing paper 9. As shown in FIG. 14, four check patterns 5a are arranged in the Y direction on the printing paper 9 and each check pattern 5a corresponds to one of the four colors CMYK. The check pattern 5a includes a plurality of (in FIG. 14, three) pattern elements 51 and a plurality of position indicating parts 52, and each of pattern elements 51 is a liner portion extending to cover the almost entire printing area on the printing paper 9 and corresponds to each of a plurality of density levels (for example, density levels of 30%, 50%, and 80%). In FIG. 14, differences between the density levels are represented by changing spaces between parallel lines in the pattern elements 51 of each check pattern 5a, and a width in the scan direction of each pattern element 51 is set to 10 mm, for example.

The check patterns 5a on the printing paper 9 move to the position under the density measurement part 24, the head moving mechanism 22 moves the head 21 in the width direction, and then densities of each pattern element 51 of the check pattern 5a are measured in a whole range in the width direction by the density measurement part 24 (Step S6). At this time, since the plurality of position indicating parts 52 in each check pattern 5a are detected by the density measurement part 24, it is possible to accurately acquire measured values, by each light receiving element, of densities of the plurality of regions corresponding to the plurality of outlets 611 (especially, the adjacent outlets 611a) in each pattern element 51.

In each pattern element 51 of the check pattern 5a, with respect to each position in the width direction (i.e., the position associated with each outlet 611), an average value (density value) of the measured values of the densities acquired by light receiving elements corresponding to the position is calculated and a density value of each of the plurality of density levels is acquired for each outlet 611 included in the module group 23. Subsequently, an average value of the density values is obtained every predetermined number of (for example, ten) outlets 611 (excepting the adjacent outlet 611a and the outlet 611 near the adjacent outlet 611a) which are continuously arranged in the width direction, and the obtained average value is a print density in each density level. With respect to the adjacent outlet 611a and the outlet 611 near the adjacent outlet 611a, a density value in each density level is used as a print density. The reciprocal of a value which is obtained by dividing the print density in each density level of the outlet 611 by a reference density value relative to the density level is calculated to obtain a correction coefficient in the density level with respect to each outlet 611 (Step S7).

Figure 15:
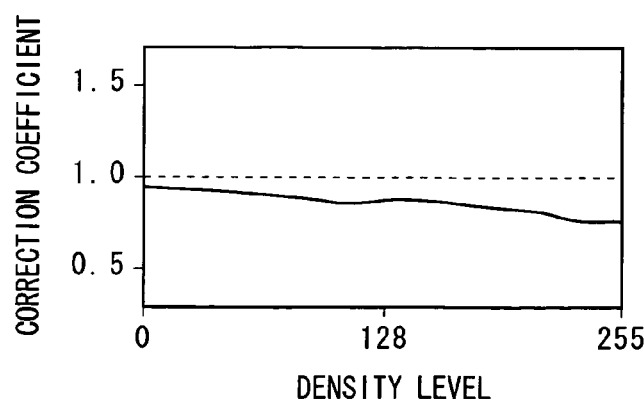
FIG. 15 is a view showing a relationship between density levels and correction coefficients.

FIG. 15 is a view showing a relationship between correction coefficients and density levels for an outlet 611. Though in the preferred embodiment the correction coefficients in three density levels are only acquired for each outlet 611, the correction coefficient in other density levels is obtained by performing an interpolation processing such as a spline interpolation. As shown in FIG. 15, the correction coefficients for the outlet 611 are smaller than 1 in all the density levels, and the correction coefficients in the range where the density levels are relatively high (the range where the density levels are 128 or more) is smaller than those in the range where the density levels are relatively low (the range where the density levels are smaller than 128). Actually, the relationship between the density levels and the correction coefficients for each outlet 611 is stored as a lookup table.

After the correction coefficients in respective density levels are obtained for each outlet 611, each element value in the basic dither matrix 83 is divided by the correction coefficient specified by treating the element value as the density level in the lookup table obtained for the corresponding outlet 611, to generate the modified dither matrix 81 (Step S8).

As discussed above, in the preferred embodiment, the measured values of the densities in the plurality of pattern elements respectively corresponding to the plurality of density levels are acquired through measurement of the plurality of pattern elements 51 by the density measurement part 24, and the operation part 111 obtains the modified dither matrix 81 on the basis of the basic dither matrix 83 which is an unmodified dither matrix and the measurement results of the density measurement part 24. This makes it possible to print an image at high speed while further suppressing occurrence of unevenness in the printed image caused by variation in ejection amounts of the droplets from the plurality of outlets 611 or the like. Though in this operation the correction coefficients used for modification of respective element values included in each element value column in the basic dither matrix 83 are different every element according to the element value, normally, since variation in the correction coefficients among the plurality of density levels of each outlet 611 is smaller than that in the correction coefficients among the plurality of outlets 611, the plurality of element values in the modified dither matrix 81 have a directional property in the column direction.

Figure 16:
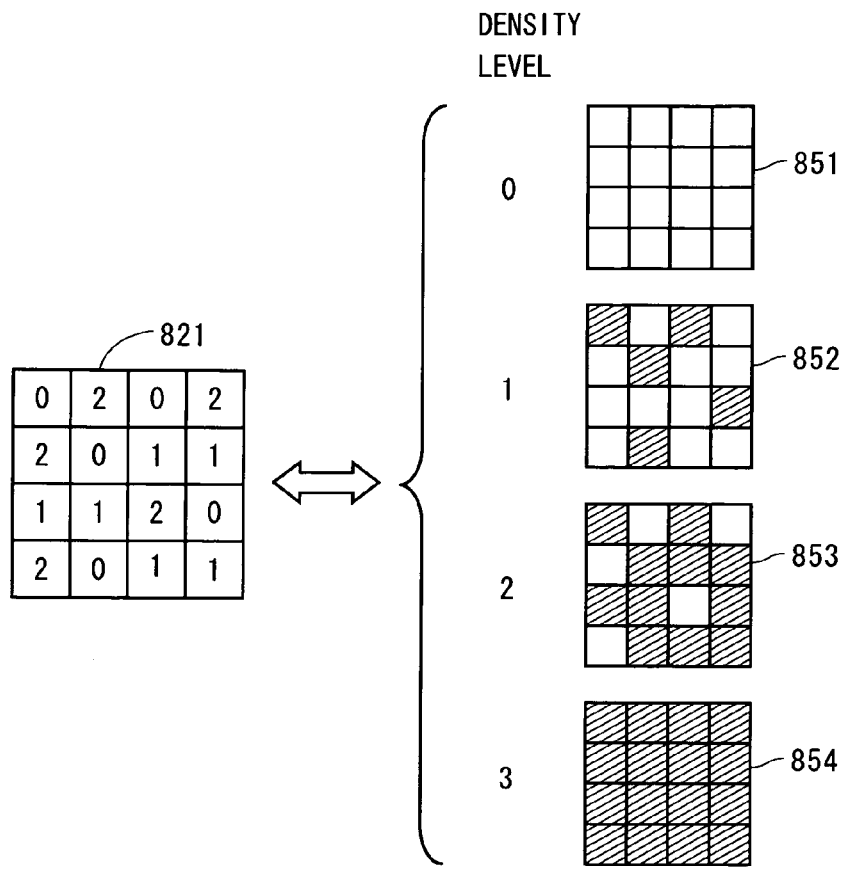
FIG. 16 is a view to explain an outline of process for generating the threshold matrix.

Next, discussion will be made on a technique of generating a preferable threshold matrix performed in Step S1 of FIG. 7. FIG. 16 is a view for explaining an outline of process for generating the threshold matrix and showing the relationship between the threshold matrix 821 and a binary dot profile representing arrangement of dots in each density level. In generation of the threshold matrix 821 obtained are the dot profiles each of which corresponds to each of the plurality of density levels included in the range of densities in the original image and has the same size as a threshold matrix to be generated, and the threshold matrix is generated from the dot profiles. For example, in a case where the density levels of the original image are 0 to 3, four dot profiles 851 to 854 corresponding to the density levels are obtained as shown in FIG. 16.

When a halftone image is generated from an image of a constant density level having the same size as the threshold matrix 821 with using the threshold matrix 821, the dot profile with the density level is generated and a position in the threshold matrix 821 which is the same position as any dot in the dot profile has a lower value than the density level. The number of dots (the pixels hatched in FIG. 16) in the dot profile increases according to increase of the density level and in two dot profiles having different density levels, dots existing in a dot profile with the low density level necessarily exist in the other dot profile with the high density level. Consequently, in a dot profile with a density level and another dot profile with a next density level to the density level, a value of the density level is assigned at the same position in a two-dimensional area corresponding to the threshold matrix as each dot which is added between the dot profiles and the above operation is repeated with sequentially changing the density level to the next density level, to generate the threshold matrix 821. The following discussion will be made on a process for obtaining the plurality of dot profiles corresponding to the plurality of density levels of the original image to generate the threshold matrix.

Figure 17A:
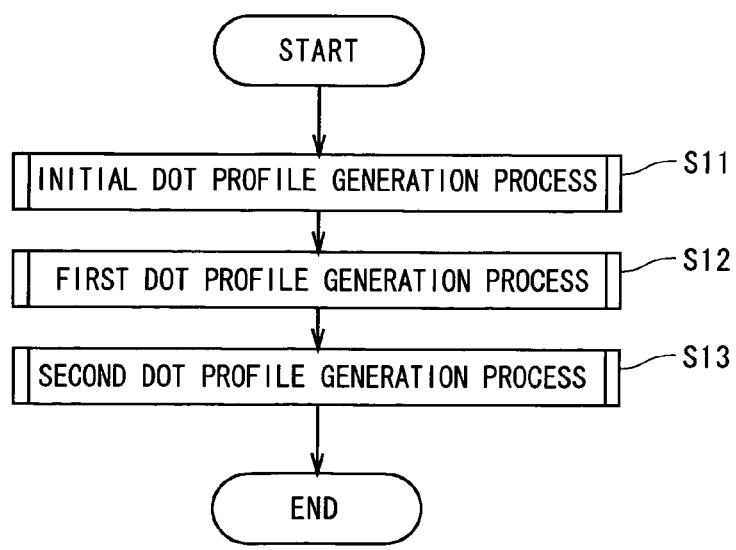
FIG. 17A is a flowchart showing an operation flow for generating the threshold matrix.
Figure 17B:
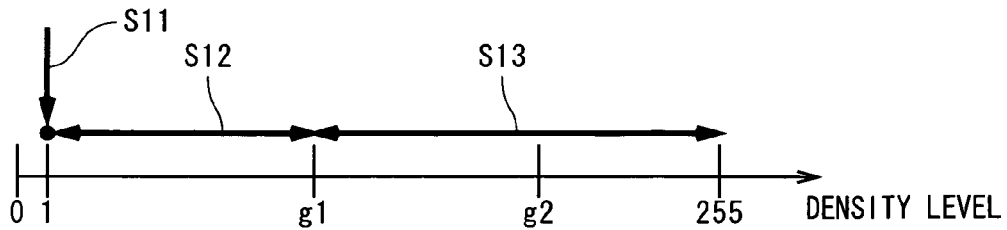
FIG. 17B is a view to explain a range of densities relating to each operation of threshold matrix generation process.

FIG. 17A is a flowchart showing an operation flow for generating the threshold matrix in the computer 11, and FIG. 17B is a view for explaining a range of densities (or density levels) relating to each operation in FIG. 17A. As shown in FIGS. 17A and 17B, in the computer 11, the dot profile with the density level 1 is obtained in the initial dot profile generation process (Step S11), the dot profile with each density level in the range of low densities from density levels 2 to g1 is obtained in the first dot profile generation process (Step S12), and then the dot profile with each density level in the ranges of middle and high densities (excepting the highest density) which are larger than a density level g1 is obtained in the second dot profile generation process (Step S13).

In the preferred embodiment, since the dot profile is sequentially generated from the low density level toward the high density level, dots (or a dot) are added in the dot profile with a density level and the dot profile with the next density level can be obtained. The number of dots included in the dot profile with a density level g shall be expressed by a cumulative distribution function n (g). The cumulative distribution function n (g) is a (broad) monotonically increasing function and is normally (n (g+1)>n (g)) and (n (0)=0), and (n (255)=Lx×Ly) (the lengths of the row and column directions in the dot profile shall be Lx and Ly). As an example of the cumulative distribution function, a linear function where the density level and the number of dots linearly increase is considered, but it is possible to use another monotonically increasing function. Hereinafter, detailed discussion will be made on each process of Steps S11 to S13 in FIG. 17A.

Figure 18:
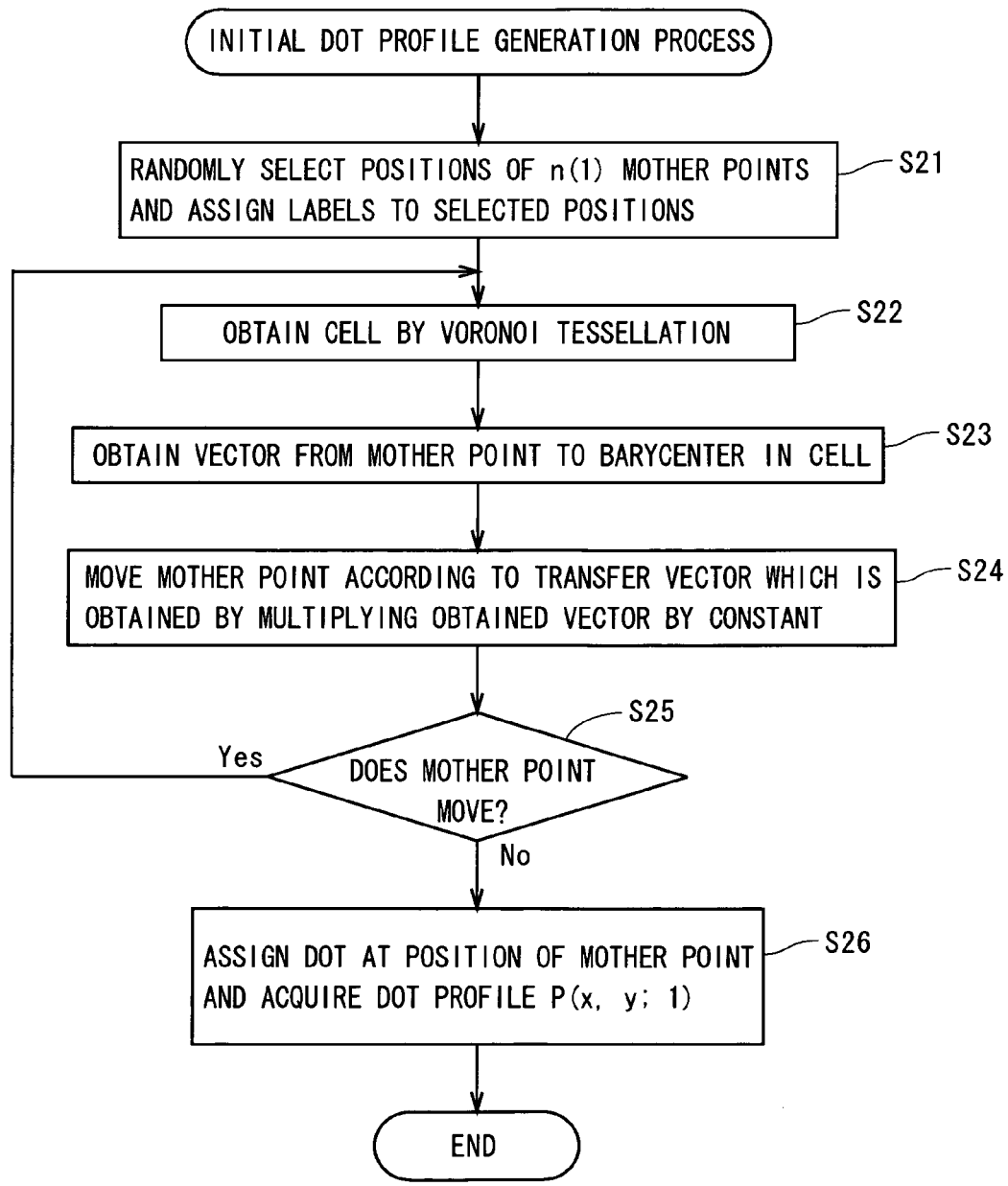
FIG. 18 is a flowchart showing an operation flow of the initial dot profile generation process.

FIG. 18 is a flowchart showing an operation flow for generating the initial dot profile and represents the operation in Step S11 of FIG. 17A. The Voronoi tessellation is utilized in the initial dot profile generation process. The Voronoi tessellation is to divide a space where the distances are defined into a plurality of cells whose nucleuses are a plurality of mother points scattering over the space, and the mother point of each cell is closest to the points included in the cell among all the mother points.

First, in a discrete two-dimensional area corresponding to the threshold matrix (i.e., two-dimensional area where the lengths of the row and column directions are Lx and Ly, and hereinafter referred to as "matrix area"), positions of the number of dots according to the initial density level 1 (i.e., integral coordinates defined in the row and column directions) are randomly selected, and the mother points are disposed at the selected positions, respectively, where different labels are assigned (Step S21). The number of dots according to the density level 1 is obtained in the cumulative distribution function n (1).

Subsequently, the closest mother point is specified to each position (position specified by coordinates (x, y)) in the matrix area, a matrix V (x, y) where the label of the specified mother point is a value corresponding to the position is obtained, and then a set of positions whose labels are the same (i.e., whose closest mother point is the same) is acquired as the cell (specifically, a discrete Voronoi tessellation is performed) (Step S22). Since the threshold matrix generated in the matrix area is repeated in the row direction in generation of the modified dither matrix as discussed above and the modified dither matrix corresponds to the repeat area 71 shown in FIG. 4, disposed mother points of n (1) are thought to be repeated both in the horizontal and vertical directions. Therefore, in the Voronoi tessellation the closest mother point to each position which is a reference for distance calculation is specified out of the plurality of mother points where the matrix area is assumed to repeat.

Figure 19:
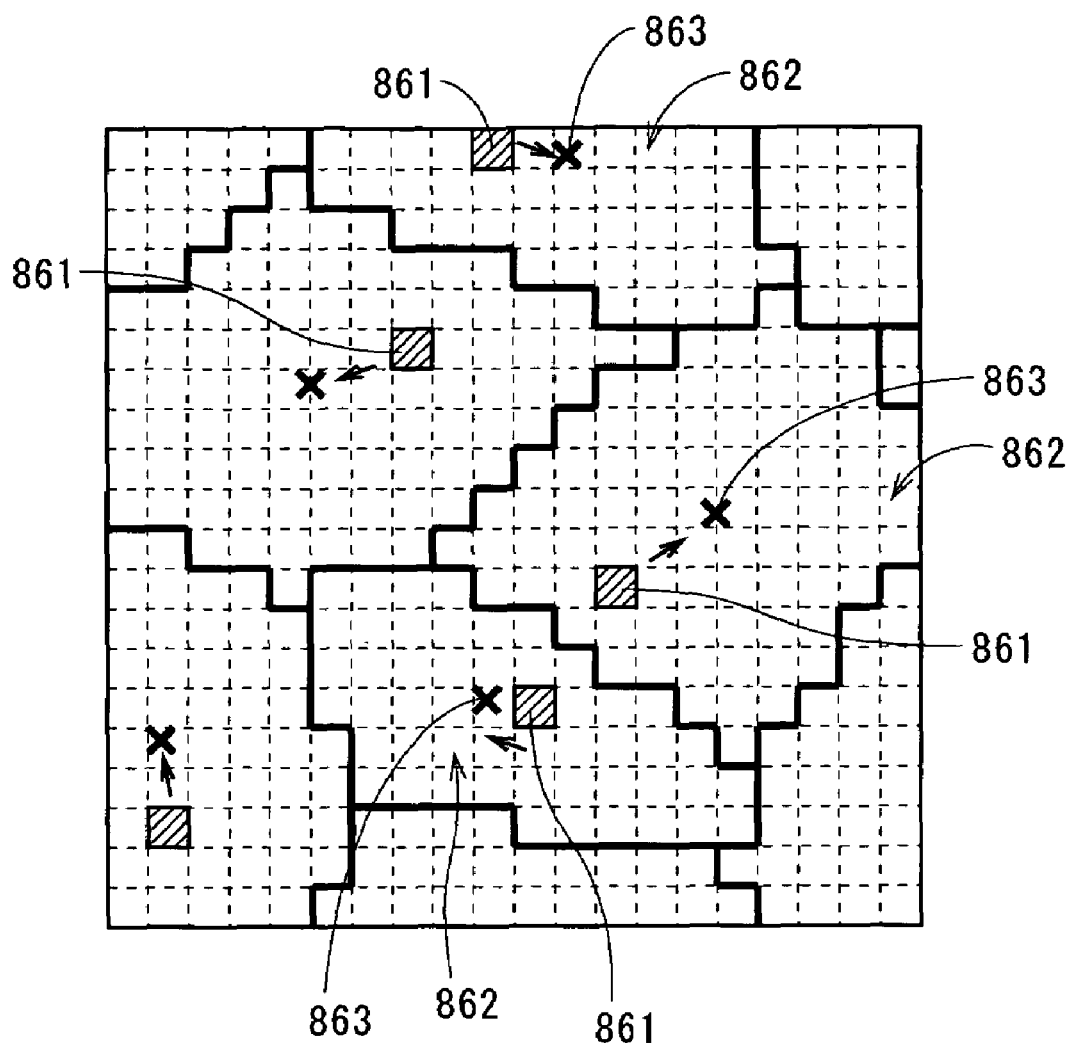
FIG. 19 is a view showing a matrix area where the Voronoi tessellation is performed.

FIG. 19 is a view showing the matrix area where the Voronoi tessellation is performed. As shown in FIG. 19, the Voronoi tessellation is performed on the basis of positions of a plurality of mother points 861, and a plurality of cells 862 (regions surrounded by thick lines in FIG. 19) are acquired in the matrix area. When the plurality of cells 862 are acquired, a barycenter 863 is obtained in each cell 862 and a vector from the mother point 861 to the barycenter 863 is obtained (Step S23). In this step, normally, the position of the mother point 861 is not identical to that of the barycenter 863 in the cell 862 and the mother point 861 is biased toward a certain direction in the cell 862. A bias of the mother point 861 in the cell 862 is practically obtained in Step S23. Then, the vector from the mother point 861 to the barycenter 863 is multiplied by C (constant) and the mother point 861 is moved according to a transfer vector multiplied by C, to improve the bias of the mother point 861 in the cell 862 (Step S24).

The above operations of Steps S22 to S24 for calculating the bias of the mother point in the cell to improve the bias are repeatedly performed (Step S25) and when the mother points are not almost moved (that is to say, the positions of mother points converge, and the vectors from the mother points to the barycenters in the cells become approximately 0), a value of the position of each mother point is set to "1" and a dot is assigned at the position (Step S26). With this operation, a dot profile P (x, y; 1) with the density level 1 where n (1) dots are almost uniformly distributed in the matrix area is acquired. The constant C used in Step S24 is a parameter for accelerating convergence of the positions of the mother points and it is set by a user in advance. Empirically, the convergence of the positions of mother points is accelerated more in the case where the constant C is 2 than in the case where the constant C is 1, and the mother points are preferably distributed when the constant C is 2.

As discussed above, in the computer 11, since dots of the number according to the first density level in the range of low densities are arranged in the matrix area and uniformity of distribution of the dots is increased using the Voronoi tessellation, it is possible to appropriately and easily generate the dot profile with the first density level in the range of low densities which has uniformity of distribution of the dots.

Figure 20:
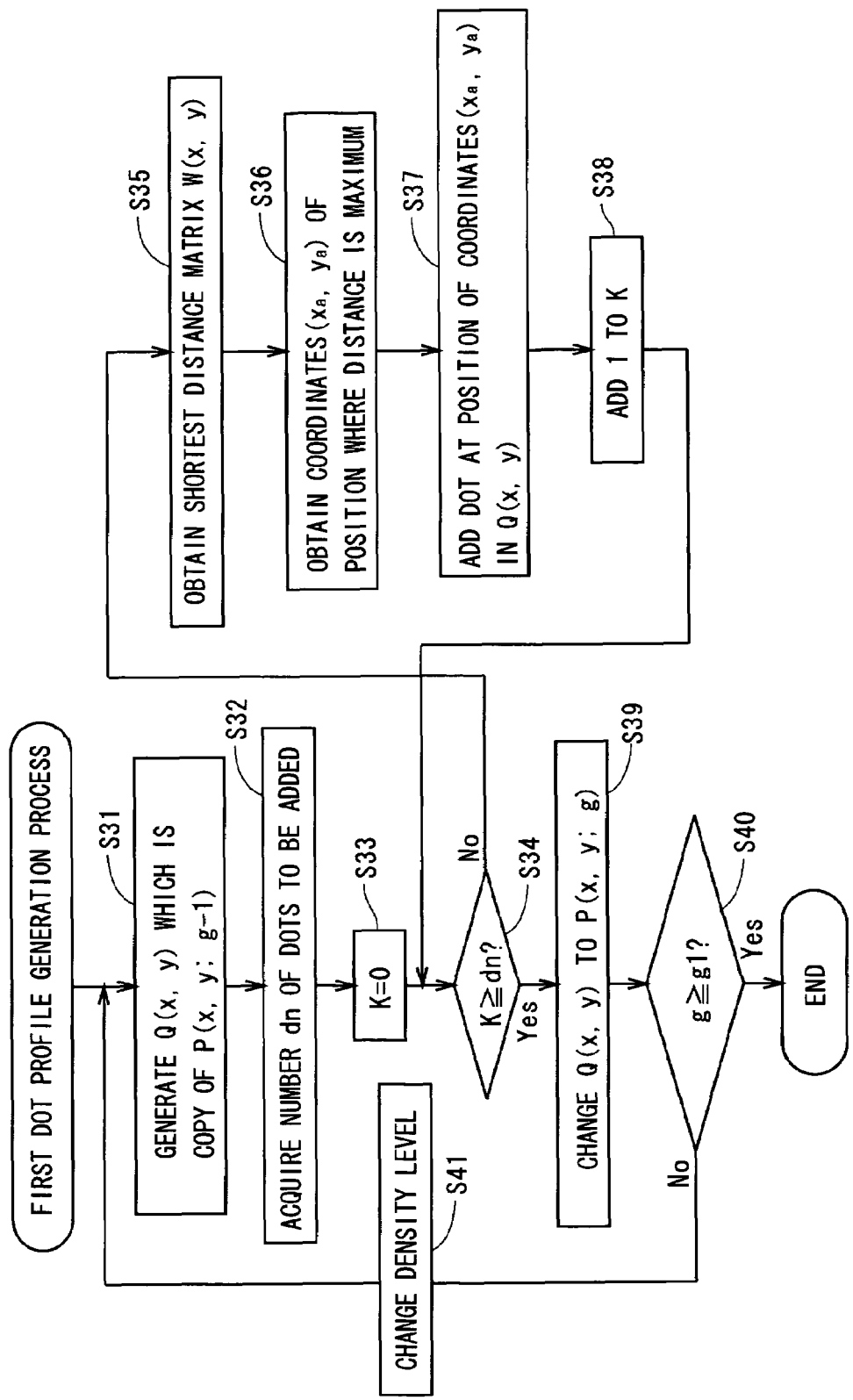
FIG. 20 is a flowchart showing an operation flow of the first dot profile generation process.

Next, in the computer 11, the dot profile is acquired for each of a plurality of density levels g ($2 \leq g \leq g1$) included in the range of low densities. FIG. 20 is a flowchart showing an operation flow for generating the first dot profile and represents the operation in Step S12 of FIG. 17A.

First, a dot profile P (x, y; g−1) with a density level (g−1) is copied in the matrix area to generate a dot profile Q (x, y) (Step S31). Since the dot profile P (x, y; g−1) is one with a density level prior to the density level g (hereinafter, referred to "target density level g") of the dot profile to be obtained, normally, the dot profile P (x, y; 1) with the density level 1 generated in the above-discussed operation is used in the first operation for generating the first dot profile. Then, the number of dots to be added is acquired by obtaining a difference dn (dn=n (g)−n (g−1)) between the number n (g) of dots in the dot profile with the target density level g and the number n (g−1) of dots in the dot profile with the density level (g−1) (Step S32). A predetermined parameter K is initialized to 0 (Step S33).

Subsequently, in the dot profile Q (x, y), the distance between each position and the closest dot is calculated in consideration of repetition of the matrix area, the shortest distance matrix W (x, y) where the calculated distance becomes a value corresponding to the position is obtained (Steps S34 and S35), and coordinates ($x_a$, $y_a$) of a position where the distance between the position and the closest dot is maximum is obtained (Step S36). In a case where there are a plurality of positions each of which has the same distance from the closest dot, one of the plurality of positions is randomly selected. Then, a value of the position of the coordinates ($x_a$, $y_a$) in the dot profile Q (x, y) is set to "1" and a dot is added at the position (Step S37). At this time, the position where the distance is maximum is the same as that of a vertex of one of polygons showing the boundaries of the cells generated in the above-discussed Voronoi tessellation, and the distances between the position and all the adjacent dots are equal. Therefore, by adding a new dot at such a position, uniformity of distribution of the dots can be almost ensured. After that, 1 is added to the parameter K (Step S38).

The above Steps S34 to S38 are repeated with changing the value of K, and a dot is sequentially added to the position farthest from all the dots in the matrix area. When the changed value of K becomes the difference dn of the number of dots between the target density level g and the density level (g−1) (i.e., when dn dots are added) (Step S34), the dot profile Q (x, y) is changed to the dot profile P (x, y; g) (Step S39) to generate a dot profile with the target density level g including n (g) dots.

In the computer 11, the above Steps S31 to S39 are repeated until the density level g of the generated dot profile becomes g1, with changing the density level to treat the dot profile P (x, y; g) of the density level g as the next target to copy in the matrix area (Steps S40, S41). With this operation, the dot profile for each of the plurality of density levels included in the range of low densities ($2 \leq g \leq g1$) is acquired. Actually, in the repetitive operations of Steps S35 to S38 relative to each density level g in the range of low densities, the combination of positions of the dots added in Step S37 is determined as the position where the value (g−1) is assigned in the matrix area.

As discussed above, in the computer 11, the binary dot profile representing arrangement of dots in each density level which is more than the first density level in the range of low densities is generated by sequentially adding a dot at the position farthest from existing dots in the matrix area, and a dot profile of each density level in the ranges of middle and high densities is generated with a later-discussed technique which is different from the above operation in FIG. 20. It is thereby possible to generate dot profiles with high uniformity in the range of low densities without performing complicated computations and generate an appropriate threshold matrix easily for a short time. In the operation of FIG. 20, when the number of dots is near to the half of (Lx×Ly), the technical meaning for obtaining the position farthest from existing dots is lost because of connection of the dots, and therefore it is preferable that the first dot profile generation process is used in such a range of the density level g where the number n (g) of dots is smaller than the half of (Lx×Ly) and the dots are not connected with one another.

Next discussion will be made on a technique for generating a dot profile for each of the plurality of density levels g included in the ranges of middle densities (g1<g≦g2) and high densities (g2<g≦254), where the computer 11 uses a predetermined energy function for quantifying a state of arrangement of dots.

First, the energy function utilized in the technique will be explained. In the preferred embodiment, a binary image shall correspond to a two-dimensional spin model used in the field of statistical physics, and the spin is a physical variable of 1 or 0. An energy value E is represented by Eq. 1 where S (x, y) is the spin matrix for expressing a binary image which is the same size as the threshold matrix in the matrix area, $(x_m, y_m)$ and $(x_n, y_n)$ are the coordinates of positions of two spins included in the spin matrix, respectively, and J is the function representing an interaction energy determined by the relative position of the two spins.

$$E = \frac{1}{2} \sum_{(x_m,y_m)} \sum_{(x_n,y_n)} J \cdot S(x_m, y_m) S(x_n, y_n) \qquad \text{Eq. 1}$$

In Eq. 1, the interaction energy is obtained for each combination of two spins included in the spin matrix S (x, y), and the total of the values each of which is obtained by multiplying the product of values of the two spins by the interaction energy becomes the energy value E. Here, the interaction energy between the two spins satisfies the conditions that a) the interaction energy is obtained in consideration of repetition of the spin matrix S (x, y) and its amount only depends on the relative position of the two spins, b) its amount has symmetry in the both spins, and c) it is not generated in the combination of the same spins. The condition a) means that in Eq. 1 the interaction energy J between the two spins is obtained with using $((x_n-x_m) \bmod Lx)$ and $((y_n-y_m) \bmod Ly)$ as parameters ((A mod B) represents the remainder in the division of A by B and is an integer which is smaller than B and equal to or larger than 0). The condition b) means that the interaction energy J that is obtained by (−a mod Lx) and (−b mod Ly) and the interaction energy J that is obtained by (a mod Lx) and (b mod Ly) are equal, and the condition c) means that the interaction energy J in the case where the values of the two parameters are 0 becomes 0. In the computer 11, the spin matrix S (x, y) is obtained so as to minimize the energy value E obtained in Eq. 1 and the dot profile is generated (the so-called optimization algorithm is used).

In the preferred embodiment, the interaction energy J becomes a larger value when the two spins are close in consideration of repetition of the matrix area. Specifically, the interaction energy J (r) is obtained in Eq. 2 where r is the minimum distance between the two spins in consideration of repetition of the matrix area. In Eq. 2, $w_1$, $w_2$, $\sigma_1$, and $\sigma_2$ are the constants of real numbers which are 0 or more with $\sigma_1 > \sigma_2$ and $w_1 > w_2$, but except for the case where the distance r is 0.

$$J(r) = \frac{w_1}{2\pi\sigma_1^2} \exp(-r^2/2\sigma_1^2) - \frac{w_2}{2\pi\sigma_2^2} \exp(-r^2/2\sigma_2^2) \qquad \text{Eq. 2}$$

Eq. 2 is a combination of two functions showing two two-dimensional normal distributions whose dispersion parameters are different from each other. In a case where the distance r between the two spins is near to 0, the interaction energy J obtained in Eq. 2 is large and in a case where the distance r is much larger than $\sigma_1$ and $\sigma_2$, the interaction energy J can be approximated to 0. Also, when the Fourier transform is performed on Eq. 2, since the value of the first term of right side is large in the low-frequency components, it functions as penalty against the low-frequency components in the energy value E and since the value of the second term of right side is large in the high-frequency components, it functions as penalty against the high-frequency components. The weightings of the first term and the second term are given by $w_1$ and $w_2$, respectively. The following discussion will be made on an operation utilizing the spin model and the interaction energy.

Figure 21:
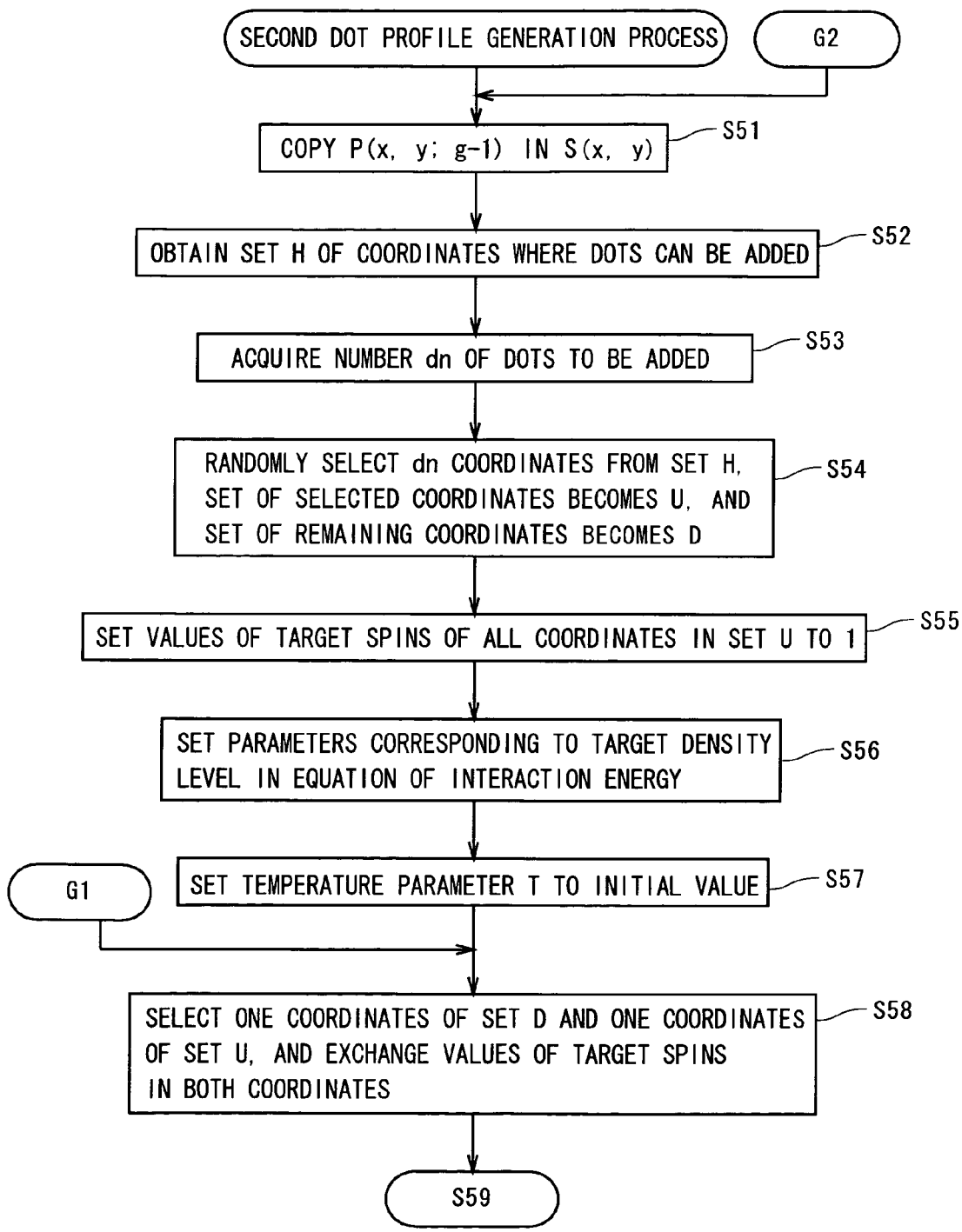
FIGS. 21 and 22 are flowcharts showing an operation flow of the second dot profile generation process.
Figure 22:
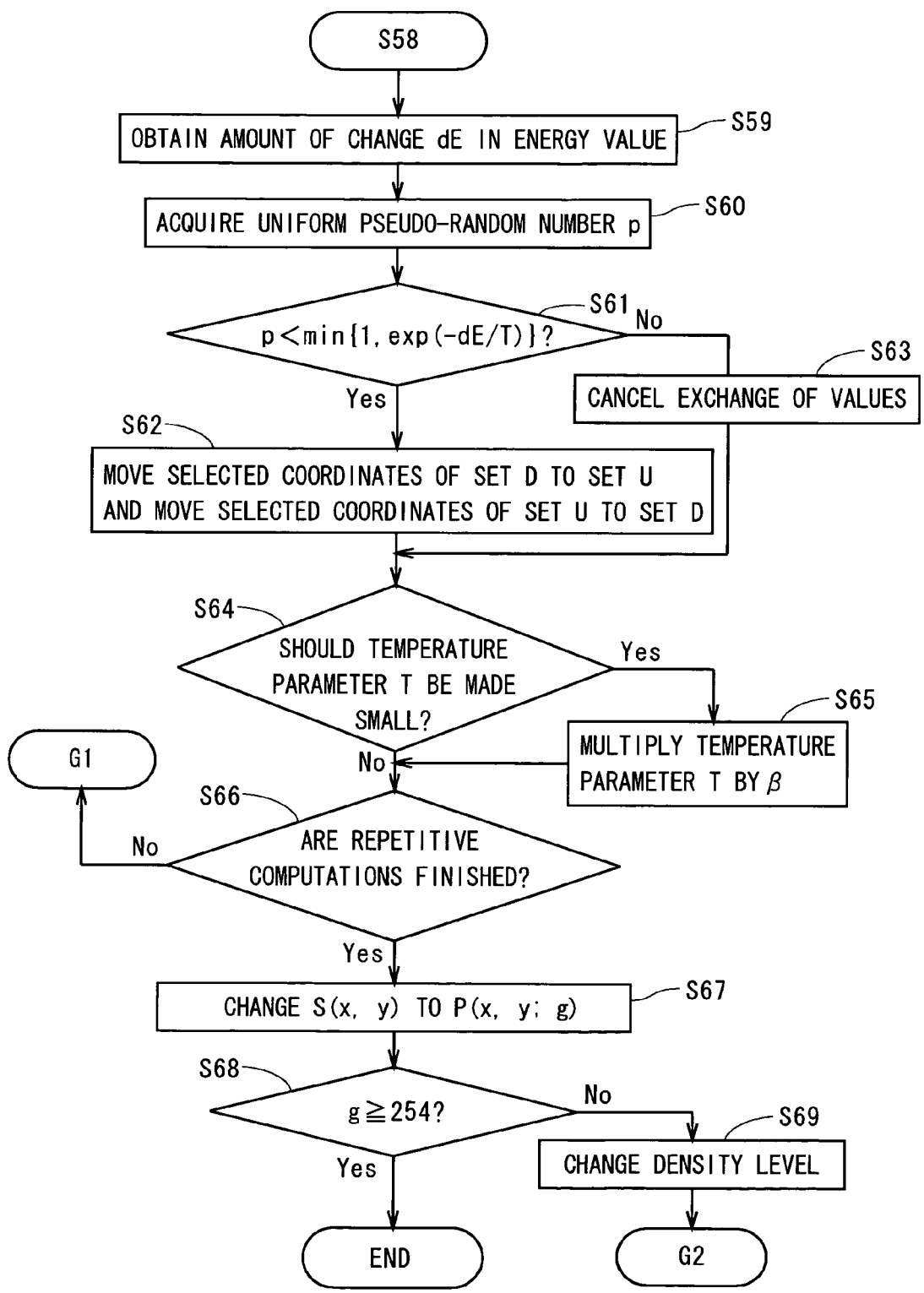

FIGS. 21 and 22 are flowcharts showing an operation flow for generating the second dot profile and represent the operation in Step S13 of FIG. 17A. Also in the second dot profile generation process, the dot profile is sequentially generated from the low density level toward the high density level in the ranges of middle and high densities.

In the computer 11, first, a dot profile P (x, y; g−1) with a density level (g−1) is copied in the spin matrix S (x, y) (Step S51). Since the dot profile P (x, y; g−1) is one with a density level prior to the density level g (the target density level g) of the dot profile to be obtained, normally, the dot profile P (x, y; g1) with the density level g1 which is lastly acquired in the operation of FIG. 20 is used in the first operation for generating the second dot profile.

Subsequently, a set H of coordinates of spins whose values are 0 (i.e., the set H is a set of positions where dots can be added in the dot profile P (x, y; g−1) and it is represented by $(H=\{(x_j, y_j); S(x_j, y_j)=0\})$) is obtained in the spin matrix S (x, y) (Step S52). A difference dn (dn=n (g)−n (g−1)) between the number n (g) of dots in the dot profile with the target density level g and the number n (g−1) of dots in the dot profile with the density level (g−1) is obtained to acquire the number of dots to be added in the dot profile P (x, y; g−1) in accordance with the target density level g (Step S53).

Thereafter, dn coordinates are randomly selected from the coordinate set H, the set of the selected coordinates becomes U and the set of the remaining coordinates becomes D (Step S54). In the spin matrix S (x, y), the values of spins of all the coordinates (x, y) included in the coordinate set U are set to 1 (Step S55). The coordinates included in the coordinate set U and the coordinate set D (i.e., the coordinate set H) indicate positions of spins to be processed (hereinafter, referred to as "target spins") in the following operation. The coordinate set U represents a set of coordinates whose values are set to 1 out of the target spins, and the coordinate set D represents a set of coordinates whose values are kept to 0 out of the target spins.

Predetermined parameters corresponding to the target density level g (i.e., the parameters are $w_1$, $w_2$, $\sigma_1$, and $\sigma_2$) are set to the equation for obtaining the interaction energy J represented by Eq. 2 (Step S56). At this time, the parameters set in Eq. 2 are different, for example, between the case where the target density level g is included in the range of middle densities (g1<g≦g2) and the case where it is included in the range of high densities (g2<g≦254), and the parameters are set by a user in advance. When the parameters corresponding to the target density level g have been already set, the operation of Step S56 is skipped.

In this operation, the Simulated Annealing is utilized for obtaining the spin matrix S (x, y) with a small energy value E. The Simulated Annealing is the technique where a statistical-physical model in which energy is defined is simulated to find out a state where the energy is made smaller by gradually shifting the equilibrium state from high temperature to low temperature. Specifically, first, a temperature parameter T (T>0) utilized in the Simulated Annealing is set to the initial value T0 (Step S57).

Next, one coordinates $(x_1, y_1)$ $((x_1, y_1) \in D)$ is randomly selected from the coordinate set D, one coordinates $(x_2, y_2)$ $((x_2, y_2) \in U)$ is also randomly selected from the coordinate set U, and then the value 0 of the target spins of the coordinates $(x_1, y_1)$ and the value 1 of the target spins of the coordinates $(x_2, y_2)$ are exchanged in the spin matrix S (Step S58). An amount of change dE in the energy value E of the spin matrix S before and after exchange of the values is obtained (Step S59).

Here, an amount of change $dE_1$ in the energy value E in a case where only a value of a spin of certain coordinates $(x_b, y_b)$ is reversed in Eq. 1 is obtained in Eq. 3 where dS is the amount of change in the value of the spin (the amount of change is (+1) or (−1)).

$$dE_1 = \sum_{(x,y)} J \cdot S(x, y) dS \qquad \text{Eq. 3}$$

Therefore, by using Eq. 3 in Step S59, an amount of change in the energy value E in the case where only the value of target spin of the coordinates $(x_1, y_1)$ is reversed and an amount of change in the energy value E in the case where the value of target spin of the coordinates $(x_2, y_2)$ is reversed after reversion of the value of target spin in the coordinates $(x_1, y_1)$ are obtained, and the sum of the amounts becomes an amount of change dE in the energy value. With this operation, the difference between the energy value of the spin matrix S (x, y) before exchange of the values and the energy value of the spin matrix S (x, y) after exchange of the values is obtained based on the change of the positions of the target spins whose values are 1. It is thereby possible to decrease the amount of computation more considerably than the case where Eq. 1 is calculated before and after the change of the positions to obtain the difference between the energy values. As described above, in Eq. 2, when the distance r is much larger than $\sigma_1$ and $\sigma_2$, the interaction energy J can be approximated to 0 and therefore, the computation of Eq. 3 has only to be performed on spins which are near to spins whose values are reversed, in consideration of repetition of the matrix area, and the amount of change dE in the energy value E can be easily obtained.

Subsequently, a uniform pseudo-random number p ($0 \leq p < 1$) is acquired (Step S60). When the uniform pseudo-random number p is smaller than min {1, exp (−dE/T)} (min {A, B} represents a smaller value out of A and B), the exchange in Step S58 is permitted (Step S61), the coordinates $(x_1, y_1)$ moves from the coordinate set D to the coordinate set U and the coordinates $(x_2, y_2)$ moves from the coordinate set U to the coordinate set D (Step S62). On the other hand, when the uniform pseudo-random number p is equal to or larger than min {1, exp (−dE/T)} (Step S61), the exchange of values is cancelled (the exchanged values of the target spins in Step S58 go back to the original values.) (Step S63). With this operation, when the amount of change dE in the energy value is larger than 0, the exchange is stochastically permitted and when the amount of change dE is equal to or smaller than 0, the exchange is necessarily permitted.

Then, it is checked whether the temperature parameter T should be made small (Step S64), when it needs to be made small, the temperature parameter T is multiplied by $\beta(0 < \beta < 1)$ to become small (Step S65), and the above operations of Steps S58 to S65 are repeated using the changed temperature parameter T (Step S66). At this time, in Step S61, by stochastically permitting the exchange also in the case where the energy value increases, the energy value is suppressed to remain in a local minimum solution. The operation of Step S65 is performed every predetermined number of repetition.

The temperature parameter T is a parameter for determining whether or not the exchange in which how much the energy value increases is permitted. If the temperature parameter T is approximately 0, the exchanges in which the amount of change dE in the energy value becomes larger than 0 are all rejected and the exchanges where the energy value does not increase are only permitted. On the other hand, if T is infinite, all the exchanges in which the amount of change dE becomes larger than 0 are also permitted and this means the state of the spin matrix S is randomly changed. Therefore, by multiplying T by β and making it small in Step S65, it is possible that during a small number of repetition, wide search is performed to make the spin matrix S reach near to an almost appropriate solution and according to increase of the number of repetition, the range of search is narrowed to obtain a solution (the spin matrix S) where the energy value becomes minimum. The temperature parameter T can be made larger as required in a case where it falls in an inappropriate local minimum solution or the like, and the operations of Steps S64 and S65 can be omitted with making the temperature parameter T constant.

In the computer 11, for example, when it is continuously repeated a predetermined number times that the amount of change dE in the energy value becomes a threshold value or less and the sharp change of the energy value is hardly occurred, repetition of the operations of Steps S58 to S65 is finished (Step S66) to obtain the spin matrix S (x, y) where the energy value becomes minimum. At this time, though the energy value E on the basis of the computation shown in Eq. 1 is not actually obtained for the spin matrix S (x, y), since in Step S59 the amount of change dE in the energy value E in the spin matrix S before and after exchange of the values is repeatedly obtained with monitoring of changing of the amount of change dE, practically, the above operations are equivalent to operations where the energy value E of the spin matrix S before and after exchange of the values is obtained to specify the spin matrix S (x, y) where the energy value E becomes minimum. Repetition of the operations of Steps S58 to S65 may be finished by performing the operation of Step S65 a predetermined number times (Step S66) and also in this case, the spin matrix S (x, y) where the energy value almost becomes minimum is acquired.

When repetition of the operations of Steps S58 to S65 are finishes, the spin matrix S (x, y) is acquired as the dot profile P (x, y; g) with the target density level g (Step S67). At this time, in the dot profile P (x, y; g), combinations of the positions of dots which are added from the dot profile P (x, y; g−1) with the density level (g−1) are positions at which the values (g−1) are assigned in the threshold matrix.

In the computer 11, Steps S51 to S67 are repeated with changing the density level to treat the acquired dot profile P (x, y; g) as the next target to copy in the spin matrix S (x, y) (Steps S68, S69). When the density level g of the acquired dot profile becomes the density level 254, the second dot profile generation process is complete (Step S68). With this operation, the dot profile is obtained for each density level in the ranges of middle and high densities and the threshold matrix 821 is generated.

As discussed above, in the spin matrix S (x, y) corresponding to the dot profile with a density level, the values of the number of the target spins in accordance with the next density level are changed to 1 in the computer 11. Then, with respect to each combination of two spins included in the spin matrix S (x, y), a value is practically obtained by multiplying the interaction energy, whose value becomes large when the distance between the two spins is near to 0, by the product of values of the two spins, and between a target spin whose value is changed to 1 and another target spin whose value is 0, the values are further exchanged so that the energy value which is the total of the values each obtained by above multiplication becomes small, to acquire the dot profile for each density level in the ranges of middle and high densities (the energy minimization technique of spin model). Therefore, with using the interaction energy, it is possible to acquire the dot profiles in the ranges of middle and high densities in each of which dots are uniformly distributed, and generate an appropriate threshold matrix. As described above, the threshold matrix is used in generation of the basic dither matrix.

Meanwhile, when a dot profile with a density level is derived from the threshold matrix generated in the above techniques or another general threshold matrix, normally, dots are randomly arranged in the dot profile (i.e., the dot profile has an isotropic property). However, if the dot profile with a density level is derived from the modified dither matrix 81 generated in the operations of FIG. 7, since the plurality of element values in the modified dither matrix 81 are modified with use of the correction coefficient relative to the outlet 611 corresponding to each element value column, there is a high possibility that dots are arranged in the column direction in the dot profile (i.e., the dot profile has a directional property in the column direction). Also, a pattern with high periodicity according to the pitch of the modules 231 (corresponding to the positions of the adjacent outlets 611a) appears in the dot profile. Thus, the modified dither matrix 81 used in printing in the printer 1 has a different characteristic from a general threshold matrix (dither matrix).

Though the preferred embodiment of the present invention has been discussed above, the present invention is not limited to the above-discussed preferred embodiment, but allows various variations.

Though the correction coefficient relative to each outlet 611 is acquired by actually printing the check patterns 5, 5a in the preferred embodiment, the correction coefficient for each outlet 611 (excepting the adjacent outlets 611a) can be prepared for each outlet 611 as shown in FIG. 23, for example, by directly measuring ejection amounts of ink from the plurality of outlets 611 or the like. Even in this case, to suppress effects on print densities based on the center-to-center distance in the width direction of the two adjacent outlets 611a between the two adjacent modules 231 in the width direction, it is preferable that densities of the regions corresponding to the adjacent outlets 611a are measured in the check pattern to modify the corresponding element values in the unmodified dither matrix.

As discussed above, from the viewpoint of easily obtaining the modified dither matrix 81 which is capable of suppressing unevenness in the printed image caused by the center-to-center distance of the two adjacent outlets 611a between the two adjacent modules 231 in the width direction, it is important that densities of the regions corresponding to the two adjacent outlets 611a in the check pattern on the printing paper 9 printed with using the unmodified dither matrix are at least measured to obtain the modified dither matrix 81 on the basis of the measurement results which are obtained by the density measurement part 24 and the unmodified dither matrix in the operation part 111.

Though each element value in the basic dither matrix 83 is modified on the basis of the ratio between (the average value of) the measured values of the corresponding densities in the check patterns 5, 5a and the reference density value, modification of the element values in the basic dither matrix 83 may be performed by other technique, and for example, a value based on the difference between the measured values of the densities and the reference density value may be added to each element value (or subtracted from each element value).

In the printer 1, the modified dither matrix 81 where the number of the positions in the row direction is more than that of the plurality of outlets 611 included in each module group 23 may be prepared. In this case, since the element values which are not used are included in the modified dither matrix 81, also in such a modified dither matrix 81 the number of the positions in the row direction is practically equal to that of the plurality of outlets 611 included in each module group 23.

Depending on the required accuracy of the printer, there may be a case where in assembling the head, the center-to-center distance in the width direction of the two adjacent outlets between the two adjacent modules 231 in the width direction is set to 0, and the plurality of modules 231 are attached on the head body 210 with certain accuracy. In this case, in the printer 1, the above two adjacent outlets are used as one outlet 611 and in printing of the original image 70, ejection control based on the pixel values located at the same positions in the row direction of the outputted image is performed on the adjacent outlets. Therefore, in generation of the modified dither matrix, both the adjacent outlets correspond to an element value column, and a density of region in the printed image corresponding to the adjacent outlets is reduced by multiplying the value of each modified element value included in the element value column by 2. Also in such a case, when the two adjacent outlets are regarded as one outlet 611, the number of the positions in the row direction of the modified dither matrix is equal to that of the plurality of outlets 611 included in each module group 23.

The position indicating parts 52 included in the check pattern 5 are not necessarily formed by the adjacent outlets 611a but may be formed by other outlets 611 or an outlet 611 only if the positions of the regions in the pattern element which are written by the adjacent outlets 611a can be accurately specified. In other words, the check pattern includes the position indicating parts related to the positions of the adjacent outlets 611a and it is possible to accurately specify the positions in the check pattern written by the adjacent outlets 611a.

Though in the above preferred embodiment the plurality of outlets 611 in the head 21 are arranged so as to cover the entire printing area on the printing paper 9 with respect to the width direction and an image can be printed on the printing paper 9 at higher speed by passing the printing paper 9 under the head 21 once (i.e., in one pass), in a case where the width of arrangement of the plurality of outlets 611 with respect to the width direction is narrower than the printing area on the printing paper 9, a mechanism for moving the head 21, as shown in FIG. 24, relatively to the printing paper 9 in the width direction (the X direction in FIG. 24) may be provided.

Further, an amount of intermittent movement in the width direction of the head 21 shown in FIG. 24 is made to a half or quarter of a length in the width direction (the length indicated by a reference sign α1 in FIG. 24) of an area 91 (area indicated by a broken-line rectangle in FIG. 24) on the printing paper 9, the area being able to be written in one scan toward the scan direction (the Y direction in FIG. 24) of the head 21, and the next scanning toward the scan direction of the head 21 may interpolate between dots arranged in the width direction of the region which is immediately before written.

The printer 1 may be provided with a mechanism for moving the head 21 in the scan direction, in this case, the printing paper 9 moves relatively to the head 21 in the scan direction. As shown in FIG. 25, in a printer with a head having an array of tilted modules with a plurality of outlets 611, the present technique of printing with using the modified dither matrix can be used. An object on which printing is performed in the printer 1 is not limited to the printing paper 9 but may be another printing media such as a film or disk.

The present technique of printing with using the modified dither matrix is especially suitable for an inkjet printer which comprises a head having a plurality of outlets (preferably, 180 outlets or more for ensuring a constant high speed in a printing operation) for recording dots at a plurality of ejection positions, respectively, which are arranged in a width direction perpendicular to a scan direction on a printing paper 9 and a scanning mechanism for moving the plurality of ejection positions on the printing paper 9 relatively to the printing paper 9 in the scan direction. However, also in an image recording apparatus having a head with an array of plurality of light emitting elements (for example, a semiconductor laser or a light emitting diode (LED)) or a head provided with a light source and light modulator elements such as GLV, where a plurality of irradiation regions on an object irradiated with a plurality of light beams from the head are scanned in a predetermined scan direction to record an image which is a set of dots on the object, the similar modified dither matrix on which the shading compensation is reflected may be generated to record an image at high speed where unevenness caused by variation in intensities of the plurality of light beams on the object or the like is suppressed.

As discussed above, the technique for generating the modified dither matrix in the above preferred embodiment can be used for various dot recording apparatuses which comprise a head having a plurality of dot output elements for recording dots in a plurality of writing element regions, respectively, arranged in a width direction perpendicular to a predetermined scan direction on an object and a scanning mechanism for moving the plurality of writing element regions on the object relatively to the object in the scan direction. In the dot recording apparatus, in a basic dither matrix which is a two-dimensional array where a plurality of element values are arranged in a column direction corresponding to the scan direction and a row direction corresponding to the width direction, and a plurality of positions in the row direction as many as the plurality of dot output elements (the number of the plurality of positions is practically the same as that of the plurality of dot output elements) are associated with the plurality of dot output elements, respectively, the plurality of element values are modified on the basis of variation in outputs of the plurality of dot output elements. With this operation, the modified dither matrix where the plurality of element values have a directional property in the column direction is generated. Then, in halftoning of a grayscale original image in recording dots, the above modified dither matrix is compared with the original image and the plurality of dot output elements in the head are controlled in accordance with comparison results, whereby an image where unevenness caused by variation in outputs of the plurality of dot output elements or the like is suppressed can be recorded at high speed.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2006-16088 filed in the Japan Patent Office on Jan. 25, 2006, the entire disclosure of which is incorporated herein by reference.

What is claimed is:

1. An inkjet printer for printing a halftone image generated by comparing a grayscale original image with a dither matrix, comprising:
a head having a plurality of outlets arranged in a width direction perpendicular to a predetermined scan direction each of which ejects droplets of ink onto a printing medium;
a scanning mechanism for moving said printing medium relatively to said head in said scan direction;
a matrix memory for storing a modified dither matrix which is a two-dimensional array where a plurality of element values are arranged in a column direction corresponding to said scan direction and a row direction corresponding to said width direction, a plurality of positions in said row direction as many as said plurality of outlets are associated with said plurality of outlets, respectively, and said plurality of element values are modified on the basis of variation in print densities with respect to said width direction caused by ejection from said plurality of outlets; and
an ejection controller for controlling ejection of ink from said plurality of outlets, in accordance with comparison results between pixel values of said original image at positions of said plurality of outlets relative to said printing medium and element values of said modified dither matrix corresponding to said pixel values, in synchronization with movement of said printing medium relative to said head.

2. The printer according to claim 1, wherein
said plurality of outlets in said head are arranged so as to cover an entire printing area on said printing medium with respect to said width direction.

3. The printer according to claim 1, further comprising:
a density measurement part for measuring densities of regions corresponding to said plurality of outlets in a predetermined pattern on said printing medium which is printed by said head with using an unmodified dither matrix; and
an operation part for obtaining said modified dither matrix on the basis of said unmodified dither matrix and measurement results acquired by said density measurement part.

4. The printer according to claim 3, wherein
said predetermined pattern includes a plurality of pattern elements corresponding to a plurality of density levels, respectively, and
said measurement results are acquired through measurement of said plurality of pattern elements by said density measurement part.

5. The printer according to claim 1, wherein
said head comprises a plurality of ejection modules in each of which outlets are arranged at a regular ejection pitch in said width direction, and
a center-to-center distance in said width direction of adjacent outlets between each combination of adjacent two of said plurality of ejection modules is equal to or longer than 0 and shorter than said ejection pitch.

6. The printer according to claim 5, further comprising:
a density measurement part for measuring densities of regions corresponding to said plurality of outlets in a predetermined pattern on said printing medium which is printed by said head with using an unmodified dither matrix; and
an operation part for obtaining said modified dither matrix on the basis of said unmodified dither matrix and measurement results acquired by said density measurement part.

7. The printer according to claim 6, wherein
said predetermined pattern includes position indicating parts each of which is located away in said scan direction from a portion used for measurement of densities and associated with positions of said adjacent outlets.

8. The printer according to claim 7, wherein
said density measurement part detects said position indicating parts, whereby a level of smoothing of measurement results is reduced in measuring densities of regions corresponding to said adjacent outlets in said predetermined pattern.

9. The printer according to claim 5, further comprising:
a density measurement part for measuring densities of regions corresponding to said adjacent outlets in a predetermined pattern on said printing medium which is printed by said head with using an unmodified dither matrix; and
an operation part for obtaining said modified dither matrix on the basis of said unmodified dither matrix and measurement results acquired by said density measurement part.

10. The printer according to claim 1, wherein
each of said plurality of outlets can form a plurality of dots having different sizes by ejecting different amounts of droplets, and
each element value of said modified dither matrix is a set of sub-element values used for determination of a size of a dot.

11. A dither matrix generation method for generating a dither matrix compared with a grayscale original image when generating a halftone image from said original image in printing in an inkjet printer which comprises a head having a plurality of outlets arranged in a width direction perpendicular to a predetermined scan direction each of which ejects droplets of ink onto a printing medium, and a scanning mechanism for moving said printing medium relatively to said head in said scan direction, said method comprising the steps of:
a) preparing a basic dither matrix which is a two-dimensional array where a plurality of element values are arranged in a column direction corresponding to said scan direction and a row direction corresponding to said width direction, and a plurality of positions in said row direction as many as said plurality of outlets are associated with said plurality of outlets, respectively; and
b) acquiring a modified dither matrix by modifying said plurality of element values on the basis of variation in print densities with respect to said width direction caused by ejection from said plurality of outlets.

12. The dither matrix generation method according to claim 11, wherein
said plurality of outlets in said head are arranged so as to cover an entire printing area on said printing medium with respect to said width direction.

13. The dither matrix generation method according to claim 11, wherein
said step b) comprises the steps of:
b1) measuring densities of regions corresponding to said plurality of outlets in a predetermined pattern on said printing medium which is printed by said head with using said basic dither matrix; and
b2) obtaining said modified dither matrix on the basis of said basic dither matrix and measurement results acquired in said step b1).

14. The dither matrix generation method according to claim 13, wherein
said predetermined pattern includes a plurality of pattern elements corresponding to a plurality of density levels, respectively, and
said measurement results are acquired through measurement of said plurality of pattern elements in said step b1).

15. The dither matrix generation method according to claim 11, wherein
said head comprises a plurality of ejection modules in each of which outlets are arranged at a regular ejection pitch in said width direction, and
a center-to-center distance in said width direction of adjacent outlets between each combination of adjacent two of said plurality of ejection modules is equal to or longer than 0 and shorter than said ejection pitch.

16. The dither matrix generation method according to claim 15, wherein
said step b) comprises the steps of:
b1) measuring densities of regions corresponding to said plurality of outlets in a predetermined pattern on said printing medium which is printed by said head with using said basic dither matrix; and
b2) obtaining said modified dither matrix on the basis of said basic dither matrix and measurement results acquired in said step b1).

17. The dither matrix generation method according to claim 16, wherein
said predetermined pattern includes position indicating parts each of which is located away in said scan direction from a portion used for measurement of densities and associated with positions of said adjacent outlets.

18. The dither matrix generation method according to claim 17, wherein
in said step b1), said position indicating parts are detected, whereby a level of smoothing of measurement results is reduced in measuring densities of regions corresponding to said adjacent outlets in said predetermined pattern.

19. The dither matrix generation method according to claim 15, wherein
said step b) comprises the steps of:
b1) measuring densities of regions corresponding to said adjacent outlets in a predetermined pattern on said printing medium which is printed by said head with using said basic dither matrix; and
b2) obtaining said modified dither matrix on the basis of said basic dither matrix and measurement results acquired in said step b1).

20. The dither matrix generation method according to claim 11, wherein
each of said plurality of outlets can form a plurality of dots having different sizes by ejecting different amounts of droplets, and each element value of said modified dither matrix is a set of sub-element values used for determination of a size of a dot.

21. An electronic apparatus-readable recording medium in which data of a dither matrix is recorded, said dither matrix being compared with a grayscale original image when generating a halftone image from said original image in printing in an inkjet printer which comprises a head having a plurality of outlets arranged in a width direction perpendicular to a predetermined scan direction each of which ejects droplets of ink onto a printing medium, and a scanning mechanism for moving said printing medium relatively to said head in said scan direction, said data being generated by executing steps including the steps of:

a) preparing a basic dither matrix which is a two-dimensional array where a plurality of element values are arranged in a column direction corresponding to said scan direction and a row direction corresponding to said width direction, and a plurality of positions in said row direction as many as said plurality of outlets are associated with said plurality of outlets, respectively; and b) acquiring a modified dither matrix by modifying said plurality of element values on the basis of variation in print densities with respect to said width direction caused by ejection from said plurality of outlets.

22. The recording medium according to claim 21, wherein said plurality of outlets in said head are arranged so as to cover an entire printing area on said printing medium with respect to said width direction.

23. The recording medium according to claim 21, wherein said step b) comprises the steps of:

b1) measuring densities of regions corresponding to said plurality of outlets in a predetermined pattern on said printing medium which is printed by said head with using said basic dither matrix; and b2) obtaining said modified dither matrix on the basis of said basic dither matrix and measurement results acquired in said step b1).

24. The recording medium according to claim 23, wherein said predetermined pattern includes a plurality of pattern elements corresponding to a plurality of density levels, respectively, and said measurement results are acquired through measurement of said plurality of pattern elements in said step b1).

25. The recording medium according to claim 21, wherein said head comprises a plurality of ejection modules in each of which outlets are arranged at a regular ejection pitch in said width direction, and a center-to-center distance in said width direction of adjacent outlets between each combination of adjacent two of said plurality of ejection modules is equal to or longer than 0 and shorter than said ejection pitch.

26. The recording medium according to claim 25, wherein said step b) comprises the steps of:

b1) measuring densities of regions corresponding to said plurality of outlets in a predetermined pattern on said printing medium which is printed by said head with using said basic dither matrix; and b2) obtaining said modified dither matrix on the basis of said basic dither matrix and measurement results acquired in said step b1).

27. The recording medium according to claim 26, wherein said predetermined pattern includes position indicating parts each of which is located away in said scan direction from a portion used for measurement of densities and associated with positions of said adjacent outlets.

28. The recording medium according to claim 27, wherein in said step b1), said position indicating parts are detected, whereby a level of smoothing of measurement results is reduced in measuring densities of regions corresponding to said adjacent outlets in said predetermined pattern.

29. The recording medium according to claim 25, wherein said step b) comprises the steps of:

b1) measuring densities of regions corresponding to said adjacent outlets in a predetermined pattern on said printing medium which is printed by said head with using said basic dither matrix; and b2) obtaining said modified dither matrix on the basis of said basic dither matrix and measurement results acquired in said step b1).

30. The recording medium according to claim 21, wherein each of said plurality of outlets can form a plurality of dots having different sizes by ejecting different amounts of droplets, and each element value of said modified dither matrix is a set of sub-element values used for determination of a size of a dot.

31. An electronic apparatus-readable recording medium in which data of a dither matrix is recorded, said dither matrix being a two-dimensional array where a plurality of element values are arranged in a column direction and a row direction and being compared with a grayscale original image when generating a halftone image from said original image in recording dots in a dot recording apparatus which comprises a head having a plurality of dot output elements for recording dots in a plurality of writing element regions, respectively, arranged in a width direction perpendicular to a predetermined scan direction on an object, said width direction corresponding to said row direction and said scan direction corresponding to said column direction, and a scanning mechanism for moving said plurality of writing element regions on said object relatively to said object in said scan direction, wherein in said dither matrix, a plurality of positions in said row direction as many as said plurality of dot output elements are associated with said plurality of dot output elements, respectively, said plurality of element values have a directional property in said column direction by modifying said plurality of element values on the basis of variation in outputs of said plurality of dot output elements.

* * * * *